US008411963B2

(12) United States Patent
Luff

(10) Patent No.: US 8,411,963 B2
(45) Date of Patent: Apr. 2, 2013

(54) METHODS AND APPARATUS TO COUNT PERSONS IN A MONITORED ENVIRONMENT

(75) Inventor: Robert A. Luff, Wittman, MD (US)

(73) Assignee: The Nielsen Company (U.S.), LLC, Schaumburg, IL (US)

( * ) Notice: Subject to any disclaimer, the term of this patent is extended or adjusted under 35 U.S.C. 154(b) by 801 days.

(21) Appl. No.: 12/537,955

(22) Filed: Aug. 7, 2009

(65) Prior Publication Data

US 2010/0195865 A1 Aug. 5, 2010

Related U.S. Application Data

(60) Provisional application No. 61/087,539, filed on Aug. 8, 2008.

(51) Int. Cl.
*G06K 9/66* (2006.01)

(52) U.S. Cl. .......................................... 382/194; 382/103

(58) Field of Classification Search .................... 382/194
See application file for complete search history.

(56) References Cited

U.S. PATENT DOCUMENTS

| 3,805,238 | A | 4/1974 | Rothfjell |
| 4,468,807 | A | 8/1984 | Moulton |
| 4,611,347 | A | 9/1986 | Netravali et al. |
| 4,626,904 | A | 12/1986 | Lurie |
| 4,644,509 | A | 2/1987 | Kiewit et al. |
| 4,658,290 | A | 4/1987 | McKenna et al. |
| 4,769,697 | A | 9/1988 | Gilley et al. |
| 4,779,198 | A | 10/1988 | Lurie |
| 4,843,631 | A | 6/1989 | Steinpichler et al. |
| 4,849,737 | A | 7/1989 | Kirihata et al. |
| 4,858,000 | A | 8/1989 | Lu |
| 4,908,704 | A * | 3/1990 | Fujioka et al. ................ 348/155 |

(Continued)

FOREIGN PATENT DOCUMENTS

| EP | 0262757 | 4/1988 |
| EP | 1133090 | 9/2001 |

(Continued)

OTHER PUBLICATIONS

Marquis Security Cameras, "Overhead Speaker with Hidden Wireless Nanny Cam Inside," NannyWatchServices, Inc., retrieved Nov. 24, 2008, from http://www.knowyournanny.com/m7_view_item. html?m7:item=118, 3 pages.

(Continued)

*Primary Examiner* — Tom Y Lu
(74) *Attorney, Agent, or Firm* — Hanley, Flight & Zimmerman, LLC

(57) ABSTRACT

Methods and apparatus to count persons in a monitored environment are disclosed. An example apparatus to count the number of people in a monitored environment is described, which includes an image sensor having a plurality of pixels, a pseudorandom number generator to generate pseudorandom coordinates, a reader to read first pixel data generated by a first pixel of the image sensor at a first time, the first pixel corresponding to the pseudorandom coordinates, a comparator to compare the first pixel data with second pixel data generated by the first pixel at a second time different from the first time to generate a change value, and a counter configured to generate a count of persons based at least on the change value.

25 Claims, 13 Drawing Sheets

U.S. PATENT DOCUMENTS

| | | | |
|---|---|---|---|
| 4,992,867 A | 2/1991 | Weinblatt | |
| 4,993,049 A | 2/1991 | Cupps | |
| 5,031,228 A | 7/1991 | Lu | |
| 5,063,603 A | 11/1991 | Burt | |
| 5,067,160 A | 11/1991 | Omata et al. | |
| 5,097,328 A | 3/1992 | Boyette | |
| 5,099,324 A | 3/1992 | Abe | |
| 5,121,201 A * | 6/1992 | Seki | 348/143 |
| 5,138,638 A | 8/1992 | Frey | |
| 5,144,797 A | 9/1992 | Swars | |
| 5,164,992 A | 11/1992 | Turk et al. | |
| 5,229,764 A | 7/1993 | Matchett et al. | |
| 5,321,396 A | 6/1994 | Lamming et al. | |
| 5,330,144 A | 7/1994 | Stevenson et al. | |
| 5,331,544 A | 7/1994 | Lu et al. | |
| 5,373,315 A | 12/1994 | Dufresne et al. | |
| 5,384,716 A | 1/1995 | Araki et al. | |
| 5,412,738 A | 5/1995 | Brunelli et al. | |
| 5,481,622 A | 1/1996 | Gerhardt et al. | |
| 5,497,185 A | 3/1996 | Dufresne et al. | |
| 5,550,928 A | 8/1996 | Lu et al. | |
| 5,581,625 A | 12/1996 | Connell | |
| 5,629,752 A | 5/1997 | Kinjo | |
| 5,656,801 A | 8/1997 | Goren et al. | |
| 5,675,663 A | 10/1997 | Koerner et al. | |
| 5,715,325 A | 2/1998 | Bang et al. | |
| 5,719,951 A | 2/1998 | Shackleton et al. | |
| 5,771,307 A | 6/1998 | Lu et al. | |
| 5,781,650 A | 7/1998 | Lobo et al. | |
| 5,793,409 A | 8/1998 | Tetsumura | |
| 5,801,763 A | 9/1998 | Suzuki | |
| 5,805,745 A | 9/1998 | Graf | |
| 5,835,616 A | 11/1998 | Lobo et al. | |
| 5,850,470 A | 12/1998 | Kung et al. | |
| 5,859,921 A | 1/1999 | Suzuki | |
| 5,864,630 A | 1/1999 | Cosatto et al. | |
| 5,878,156 A | 3/1999 | Okumura | |
| 5,892,837 A | 4/1999 | Luo et al. | |
| 5,901,244 A | 5/1999 | Souma et al. | |
| 5,920,641 A | 7/1999 | Ueberreiter et al. | |
| 5,963,670 A | 10/1999 | Lipson et al. | |
| 5,978,507 A | 11/1999 | Shackleton et al. | |
| 5,987,154 A | 11/1999 | Gibbon et al. | |
| 6,032,106 A | 2/2000 | Ishii | |
| 6,047,134 A | 4/2000 | Sekine et al. | |
| 6,055,323 A | 4/2000 | Okumura | |
| 6,061,088 A | 5/2000 | Khosravi et al. | |
| 6,141,433 A | 10/2000 | Moed et al. | |
| 6,144,797 A | 11/2000 | MacCormack et al. | |
| 6,185,314 B1 | 2/2001 | Crabtree et al. | |
| 6,263,088 B1 | 7/2001 | Crabtree et al. | |
| 6,332,033 B1 | 12/2001 | Qian | |
| 6,332,038 B1 | 12/2001 | Funayama et al. | |
| 6,335,976 B1 * | 1/2002 | Belmares | 382/103 |
| 6,363,159 B1 | 3/2002 | Rhoads | |
| 6,445,810 B2 | 9/2002 | Darrell et al. | |
| 6,507,391 B2 | 1/2003 | Riley et al. | |
| 6,611,622 B1 | 8/2003 | Krumm | |
| 6,625,316 B1 | 9/2003 | Maeda | |
| 6,940,545 B1 | 9/2005 | Ray et al. | |
| 6,944,319 B1 | 9/2005 | Huang et al. | |
| 6,985,606 B1 | 1/2006 | Wilkinson | |
| 7,035,467 B2 | 4/2006 | Nicponski | |
| 7,054,481 B2 | 5/2006 | Lloyd-Jones | |
| 7,110,570 B1 | 9/2006 | Berenz et al. | |
| 7,134,130 B1 | 11/2006 | Thomas | |
| 7,155,159 B1 | 12/2006 | Weinblatt et al. | |
| 7,158,177 B2 | 1/2007 | Kage et al. | |
| 7,171,024 B2 | 1/2007 | Crabtree | |
| 7,203,338 B2 | 4/2007 | Ramaswamy et al. | |
| 7,319,479 B1 | 1/2008 | Crabtree et al. | |
| 7,466,844 B2 | 12/2008 | Ramaswamy et al. | |
| 7,609,853 B2 | 10/2009 | Ramaswamy et al. | |
| 8,194,923 B2 | 6/2012 | Ramaswamy et al. | |
| 2002/0198762 A1 | 12/2002 | Donato | |
| 2003/0033600 A1 | 2/2003 | Cliff et al. | |
| 2004/0001141 A1 | 1/2004 | Schlaff | |
| 2004/0220753 A1 | 11/2004 | Tabe | |
| 2005/0144632 A1 | 6/2005 | Mears et al. | |
| 2005/0185945 A1 | 8/2005 | Zhang et al. | |
| 2005/0198661 A1 | 9/2005 | Collins et al. | |
| 2006/0062429 A1 | 3/2006 | Ramaswamy et al. | |
| 2006/0067456 A1 | 3/2006 | Ku et al. | |
| 2006/0164240 A1 | 7/2006 | Patchell | |
| 2006/0200841 A1 | 9/2006 | Ramaswamy et al. | |
| 2007/0273514 A1 | 11/2007 | Winand et al. | |
| 2007/0285579 A1 | 12/2007 | Hirai et al. | |
| 2008/0091510 A1 | 4/2008 | Crandall et al. | |
| 2009/0133058 A1 | 5/2009 | Kouritzin et al. | |
| 2009/0265729 A1 | 10/2009 | Weinblatt | |
| 2009/0290756 A1 | 11/2009 | Ramaswamy et al. | |
| 2012/0213410 A1 | 8/2012 | Ramaswamy et al. | |

FOREIGN PATENT DOCUMENTS

| | | |
|---|---|---|
| WO | 96/05571 | 2/1996 |
| WO | 99/27688 | 6/1999 |
| WO | 2004/053791 | 6/2004 |
| WO | 2004/054255 | 6/2004 |

OTHER PUBLICATIONS

Duncan Graham-Rowe, "Hot Shopping," New Scientist Magazine, Issue 2230, Mar. 18, 2000, retrieved from www.newscientist.com/article.ns?id=mg16522301.700&print=true, 1 page.

IBM Exploratory Computer Vision Group, "Infrared Person Tracking", Jun. 12, 2002, 2 pages, www.research.ibm.com/ecvg/misc/footprint.html, 2 pages.

United States Patent and Trademark Office, "Notice of Allowance and Fee(s) Due" issued in connection with U.S. Appl. No. 10/538,483, mailed Jul. 18, 2006, 10 pages.

Patent Cooperation Treaty, "International Search Report" corresponding to International Application No. PCT/US02/39619, Mar. 11, 2003, 4 pages.

International Preliminary Examining Authority, "Written Opinion," issued in connection with PCT Application No. PCT/US02/39619, mailed Apr. 20, 2004, 5 pages.

International Preliminary Examining Authority, "Written Opinion," issued in connection with PCT Application No. PCT/US02/39619, mailed Aug. 22, 2003, 5 pages.

Patent Cooperation Treaty, "International Preliminary Examination Report" issued in connection with PCT Application No. PCT/US02/39619, Jun. 1, 2004, 3 pages.

United States Patent and Trademark Office, "Notice of Allowance and Fee(s) Due" issued in connection with U.S. Appl. No. 11/548,578, mailed Sep. 10, 2008, 7 pages.

United States Patent and Trademark Office, "Office Action" issued in connection with U.S. Appl. No. 11/548,578, mailed Dec. 14, 2007, 9 pages.

United States Patent and Trademark Office, "Office Action" issued in connection with U.S. Appl. No. 11/548,578, mailed Mar. 22, 2007, 8 pages.

Duda et al, "Pattern Classification & Scene Analysis," Chapter 2, Bayes Decision Theory, Stanford Research Institute, Menlo Park, CA, pp. 10-43, Wiley Publishers, 1973.

International Preliminary Examination Authority, "International Preliminary Examination Report" issued in connection with PCT Application No. PCT/US2002/039625, Apr. 27, 2004, 4 pages.

Qing et al. "Histogram Based Fuzzy C—Mean Algorithm for Image Segmentation," Pattern Recognition, 1992. vol. III. Conference C: Image, Speech and Signal Analysis, Proceedings., 11th IAPR International Conference, Aug. 30-Sep. 2, 1992.

Stephen Wolfram, "Mathematica a System for Doing Mathematics by Computer", 2d Ed., Addison-Wesley Publishing Company, Inc., 1991, pp. 665-666.

"Convex Hull", http://www.cse.unsw.edu.au/~lambert/java/3d/ConvexHull.html, downloaded Nov. 6, 2002.

"What is convex hull? What is the convex hull problem?," http://www.ifor.math.ethz.ch/~fukuda/polyfaq/node13.html, downloaded Nov. 6, 2002.

"1.6.2 Convex Hull," http://www.cs.sunysb.edu/~algorith/files/convex-hull.shtml, downloaded Nov. 6, 2002.

International Searching Authority, "International Search Report," issued in connection with PCT Application No. PCT/US2002/039625, mailed Jun. 20, 2003, 5 pages.

United States Patent and Trademark Office, "Notice of Allowance" issued in connection with U.S. Appl. No. 10/538,692, mailed Jul. 16, 2009, 17 pages.

United States Patent and Trademark Office, "Office Action" issued in connection with U.S. Appl. No. 10/538,692, mailed Apr. 14, 2009, 10 pages.

United States Patent and Trademark Office, "Notice of Allowance and Fee(s) Due" issued in connection with U.S. Appl. No. 12/533,629, mailed Jan. 31, 2012, 8 pages.

United States Patent and Trademark Office, "Office Action" issued in connection with U.S. Appl. No. 12/533,629, mailed Apr. 27, 2011, 12 pages.

United States Patent and Trademark Office, "Office Action" issued in connection with U.S. Appl. No. 12/533,629, mailed Oct. 18, 2011, 13 pages.

United States Patent and Trademark Office, "Supplemental Notice of Allowance and Fee(s) Due" issued in connection with U.S. Appl. No. 10/538,483, mailed Aug. 31, 2006, 10 pages.

* cited by examiner

| | X | Y | BRIGHT | R,G,B | Change |
|---|---|---|---|---|---|
| | 245 | 940 | 75 | (45,61,100) | 0 |
| | 465 | 143 | 76 | (72,60,67) | 0 |
| | 525 | 875 | 80 | (101,191,80) | 3 |
| | 58 | 824 | 76 | (243,26,35) | 250 |
| | 757 | 182 | 74 | (182,50,231) | 165 |
| | 686 | 405 | 65 | (16,108,80) | 234 |
| | 171 | 522 | 61 | (145,158,33) | 84 |
| | 808 | 133 | 76 | (155,215,90) | 65 |
| | 348 | 504 | 72 | (158,124,243) | 178 |
| | 190 | 885 | 76 | (96,170,205) | 62 |
| | 947 | 696 | 75 | (237,185,82) | 210 |
| | 338 | 385 | 76 | (251,191,195) | 125 |
| | ... | ... | ... | ... | ... | ns # METHODS AND APPARATUS TO COUNT PERSONS IN A MONITORED ENVIRONMENT

This application claims the benefit of U.S. Provisional Application No. 61/087,539, filed Aug. 8, 2008, of which is incorporated by reference in its entirety.

FIELD OF THE DISCLOSURE

This disclosure relates generally to audience measurement research and, more particularly, to methods and apparatus to count persons in a monitored environment.

BACKGROUND

Audience measurement of broadcasted television and/or radio programs has been practiced for many years. Audience measurement devices typically collect two kinds of information from households, namely, tuning information (e.g., information indicating the content presented to the audience such as channel information, time of consumption information, program information, etc.) and people information (e.g., information about the demographics of the audience). These two types of information are combined to produce meaningful ratings data.

People information has historically been gathered by people meters. People meters have been constructed in many different manners. For example, some people meters are active devices which seek to determine the composition of the audience by, for instance, analyzing visual images of the audience to actively determine the identity of the people in the audience. Such active determination involves comparing facial features of an individual appearing in a captured image to one or more previously stored facial feature images to search for a match. Other people meters are passive devices which prompt the members of the viewing audience to identify themselves by logging themselves in at specific times. These specific prompting times can be independent of the tuning information and at fixed time intervals (i.e., time-based prompting) or they can be tied to the tuning information and be performed, for example, when the channel changes (i.e., channel change-based prompting).

The time-based prompting technique poses a danger of under sampling or over sampling the data. For example, if the prompts are spaced too far apart in time, audience members may enter or leave the room between prompts. If the audience does not notify the people meter of such entrances/exits, audience composition data and audience change timing is lost. Alternatively, if the time prompts are spaced too closely in time, the audience members may become annoyed and/or reduce their compliance with the prompt requests. Again, audience composition data is lost in such circumstances.

The channel change-based prompting technique discussed above poses the danger of over sampling the data. As explained above, such overly frequent prompting may cause irritation and/or result in a decrease in compliance and a corresponding loss of data collection and/or invalid data.

It is also of interest to advertisers to know how many people are exposed to media, such as a particular sporting event, in public establishments such as a bar or a restaurant. Current methods include self-reporting by establishment owners and paid head-counters, which can be expensive, unreliable, and time-consuming.

DETAILED DESCRIPTION

Figure 1:
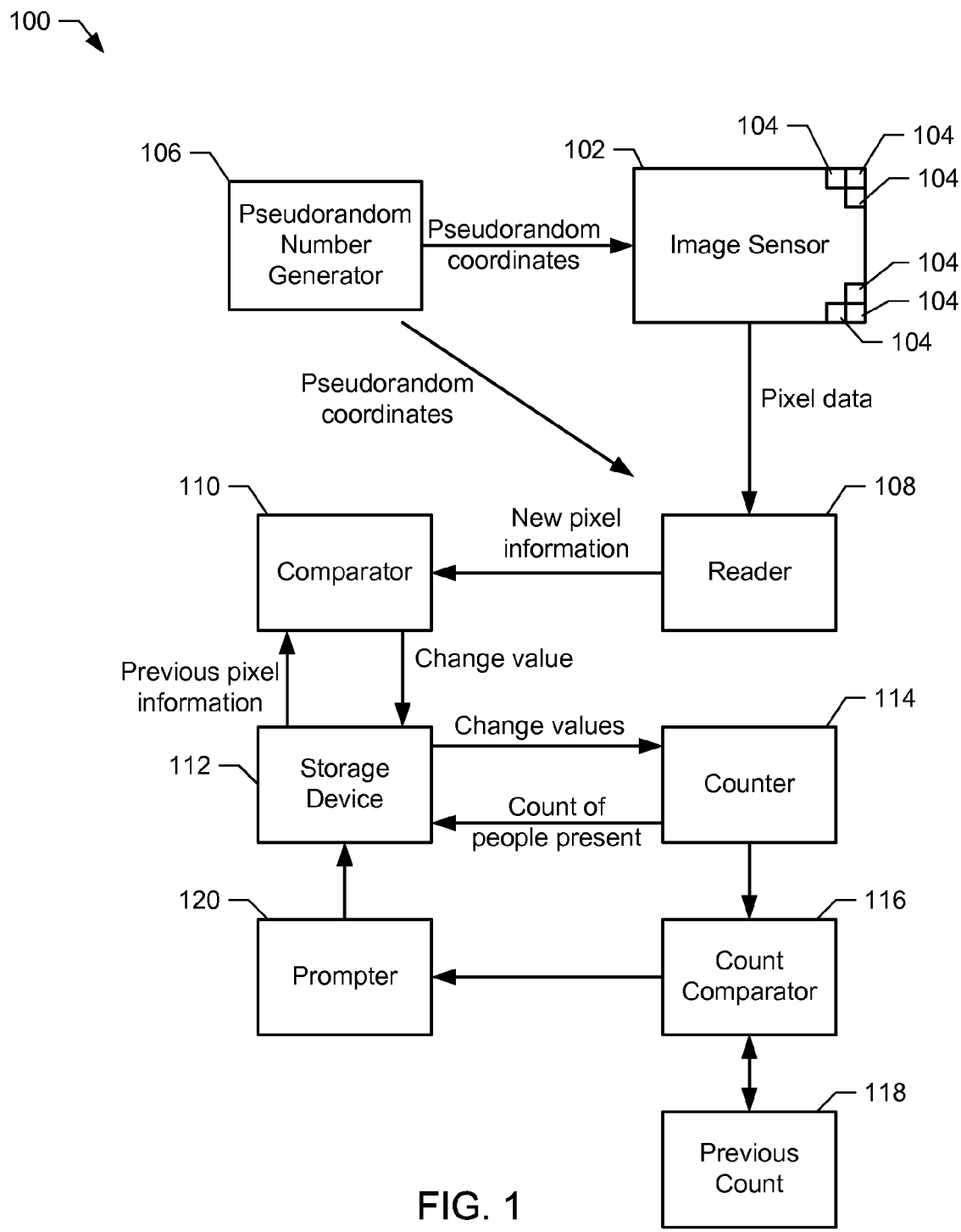
FIG. 1 is a block diagram of an example apparatus configured to count one or more persons in a monitored environment.

The example methods and apparatus described herein are adapted to be used to count persons in a monitored environment. Such environments may include households of the type selected for audience measurement, or commercial establishments where people may be exposed to media, such as a retail store, bar, or restaurant.

Example apparatus to count the number of people in a monitored environment are described below. Some such apparatus include an image sensor of the type that may be found in, for example, a digital camera. The image sensor may be composed of picture elements (i.e., pixels) to form a field of view of the image sensor, where each of the pixels corresponds to a particular place in a two-dimensional coordinate system. The image sensor receives coordinates from a coordinate generator and activates the pixel corresponding to the coordinates. A pixel reader collects data from the activated pixel (e.g., brightness and color), but not from the other pixels.

In order to protect the privacy of person(s) present in the monitored environment, it is desirable to prevent the image sensor from activating the pixels in a manner that may enable a human-recognizable (e.g., photographic) image of the image sensor's field of view to be generated. To accomplish this, a disclosed example apparatus is provided with a pseudorandom number generator to generate the coordinates of a pixel in the image sensor. Only the pixel corresponding to the coordinates is read. Then another pixel is randomly or pseudorandomly selected and read. By pseudorandomly selecting pixels from which to read data and preventing storing of raw data retrieved from the selected pixels, the apparatus is prevented from generating a human-recognizable image. As a result, the privacy of the individual(s) in the monitored environment is protected.

In order to detect the presence of person(s) in the monitored environment, when new pixel data is read from the image sensor, it is compared to previous pixel data corresponding to the same pixel. The previous pixel data may be representative of a monitored room at a time when it known that no people are present in the field of view of the image sensor. The comparison of the pixel data is used by the disclosed apparatus to generate a change value representative of the magnitude of difference between the new pixel data and the previous pixel data. The change value is stored in a memory or storage device, and/or the change value is plotted on a "change map" at a location corresponding to the pixel location. When sufficient numbers of change values have been accumulated and/or the change map is sufficiently covered with values, a counter processes the map to count or approximate the number of people in the field of view.

The example methods and apparatus described herein have the advantage of leveraging the high resolution of modern image sensors to detect people, while avoiding potential privacy and/or security issues related to human-recognizable imaging. Employing high-resolution image sensors in combination with the disclosed methods produce more accurate counts of people for the purposes of, for example, measuring audience composition or other useful applications. In the audience measurement context, automatically counting people in the audience can be used to reduce or eliminate over-prompting or under-prompting, as prompting can be driven by detection of a chance in the number of people in the audience.

The example smart speaker systems and methods described herein are useful for reducing the installation costs of people-counting technology in commercial establishments, thereby making people-counting technology more feasible and/or affordable for many commercial establishments. In some examples, existing speaker systems are multiplexed with a people-counting system and a power supply system to take advantage of existing wired or wireless connection schemes or infrastructure. In some examples, smart speakers replace existing speakers to use the audio source and wiring connected to the existing speakers.

Some described example systems and methods are more easily installed and maintained than known people counting technologies, which increases the benefit and reduces the risk to a commercial establishment implementing the people-counting. In some examples, one or more existing speakers are replaced with smart speakers to monitor a portion or all of a commercial space. In some examples, smart speakers may be installed near the entrance(s) and exit(s) of the commercial establishment to count the number of persons in the commercial establishment at any given time. In such a configuration, a commercial establishment would has an early warning about customer loading in the commercial space, allowing the commercial establishment to adapt its service level accordingly. Additionally or alternatively, some example systems cover a portion or all of the commercial space using, for example, a grid system.

FIG. 1 is a block diagram of an example apparatus 100 to count one or more persons in a monitored environment. The apparatus 100 may be implemented as, for example, a people counter to complement a logging device in a monitored home environment, a counter to count or approximate the number of people in a large monitored environment (e.g., a commercial establishment), or any other application that may benefit from counting or approximating people or objects in the manner described below. Because the use of images may raise privacy and/or security concerns, the example apparatus 100 is configured such that a human-recognizable image is not generated by the apparatus 100. The example apparatus 100 includes an image sensor 102 that generates data in response to exposure to light. Example image sensors that may be used to implement the image sensor 102 include charge-coupled devices (CCDs), complementary metal-oxide-semiconductor (CMOS)-fabricated image sensors (e.g., active-pixel sensors), Bayer sensors, Foveon X3 sensors, vacuum tube sensors, or any other type of image sensor.

The example image sensor 102 may include large numbers of picture elements 104, or pixels (e.g., on the order of hundreds of thousands or even millions). Some commonly available pixel resolutions include 640×480, 1024×768, 2048×1536, and 3200×2400. Each pixel 104 is an individual unit that generates a charge, voltage, or other signal responsive to a number of photons of light that are absorbed by the pixel 104. The time the pixels 104 are exposed to a light source is controlled by an aperture, which opens for a length of time to expose the pixels 104 to light and then closes to prevent further light from reaching the pixels 104. Exposure of the pixels 104 to light for a brief period may be referred to as sampling. The pixels 104 in most image sensors are organized in a rectangular geometry. As a result, a particular pixel 104 may be referred to in terms of the row and column of the rectangular geometry in which it lies. Individual pixels 104 may also be referred to by a coordinate system (e.g., a Cartesian coordinate system).

Many modern camera or image chips include a device (e.g., a data register) to receive pixel data from an image sensor. However, in an effort to achieve high efficiency and/or speed, the device receives an entire row (or column) of pixel data at a time. In the example apparatus 100, data is only desired from one pixel 104 at a time to prevent a human-recognizable image from being generated. To select one pixel 104 at a time, the apparatus 100 includes a pseudorandom number generator 106 to provide pseudorandom numbers representative of coordinates. (Pseudorandom numbers are values that appear random but are actually deterministic. If truly random numbers are available, they may equivalently be used in place of the pseudorandom number generator discussed herein. Therefore, as used herein, the term "pseudorandom" is intended to encompass both truly random and pseudorandom.)

For example, if an image sensor has a 1000 pixel×1000 pixel field of view, the pseudorandom number generator 106 generates two pseudorandom numbers, which are treated as X,Y coordinate or a row and a column number. Because the image sensor 102 is 1000×1000 pixels, each number output by the pseudorandom number generator 106 is constrained to fall between 1 and 1000. The coordinates generated by the pseudorandom number generator 106 of the illustrated example are provided to the image sensor 102. The example image sensor 102 responds by activating and collect data from a particular pixel 104 corresponding to the coordinates. In alternative examples, the image sensor 102 outputs an entire image to a reader 108, which responds by parsing through rows and/or columns of pixel data to obtain the pixel data corresponding to the coordinates. In some examples, rather than operating with coordinates, the pixels 104 in the image sensor 102 are each assigned a unique number (e.g., 1-1,000,000 for a 1000×1000 image sensor), and the pseudorandom number generator 106 generates a number within the range of numbers for processing by the image sensor 102 or the reader 108.

In a faster sampling alternative, the pseudorandom number generator 106 generates one pseudorandom number corresponding to a row (or column). The reader 108 then generates pixel information for every pixel in the row (or column). Such an approach may allow for faster population but sacrifice some privacy.

The image sensor 102 of the illustrated example sends pixel data to the reader 108. The reader 108 receives the pixel data. In examples in which the image sensor 102 outputs more than one pixel of data at a time, the reader 108 parses out the data corresponding to a particular pixel 104 specified by the pseudorandom number generator 106. Parsing pixel data is necessary if pixel data for multiple pixels 104 is received and data is needed from only a subset of those pixels 104. If the image sensor 102 is addressable on a pixel by pixel basis, the reader 108 does not need to parse the pixel data.

Under either approach, the reader 108 generates pixel information corresponding to the light received at the selected pixel 104. In the illustrated example, the pixel information includes values representative of brightness and color. Color values may be represented by three values, one value each for red, green, and blue (RGB), where a higher value indicates the corresponding color is more prevalent.

In the example of FIG. 1, the pixel information is sent to a comparator 110 to be compared with previous pixel information from the same pixel 104. The previous pixel information of the illustrated example is representative of pixel data read from the image sensor 102 at a time when the monitored environment was known to have no people present in the field of view of the image sensor 102. As a result, the example comparator 110 compares the new pixel information with the previous pixel information to generate a change value associated with the pixel 104 specified by the pseudorandom number generator 106. The change value may be determined from relative differences in brightness and/or color (RGB).

The example apparatus 100 includes a storage device 112 to store pixel information and/or change values. Preferably, the only pixel information stored in the storage device 112 is previous pixel information that is indicative of a field of view of the image sensor 102 when there are no people present. This previous pixel data provides reference pixel information for the comparator 110 to compare to the new pixel information to determine a change value for the pixel. The change values stored in the storage device 112 are generated by the comparator 110 based on the comparison of new pixel information and previous pixel information. The change values may be stored in a table format, including, for example, the coordinates of the corresponding pixel and a timestamp, as described below. An example table 1220 is shown and described below in FIG. 12.

The stored pixel information, as mentioned above, is pixel information collected at a time when there are no people present in the field of view of the image sensor 102. The collective pixel information stored in the storage device may, thus, be a human-recognizable image if plotted with X,Y coordinates. However, an image created from the pixel information would not include any persons in the field of view, but merely the monitored environment. Alternatively, rather than storing the previous pixel data, the storage device 112 may store reference change values generated by a comparison between the monitored environment when no people are present and a reference image (e.g., a flat white image or a flat gray image). In this case, the new pixel information is compared to the same reference image to generate an intermediate change value. The resulting change value is then compared to the reference change value for the corresponding pixel 104 to generate a final change value. This example approach avoids the need to store a human-recognizable image of the monitored environment in the storage device 112.

When enough change values are stored to account for a predetermined percentage of the field of view of the image sensor 102, the change values are sent to a counter 114 to determine the number of people present in the monitored environment. The counter 114 analyzes the change values by, for example, discerning blobs into counts of people. Once a count of people is determined by the counter 114, the count is stored in the storage device 112 with associated data (e.g., program, channel, and time/date stamp). In the illustrated example, the count is compared by a count comparator 116 to a previous count 118 to determine if a number of persons present in the monitored environment has changed. If so, a prompter 120 is activated to request the audience member(s) to identify themselves so that the audience composition is accurately known. If the count comparator 116 determines the people count has not changed, then it does not activate the prompter 120 and no prompting occurs.

Figure 2:
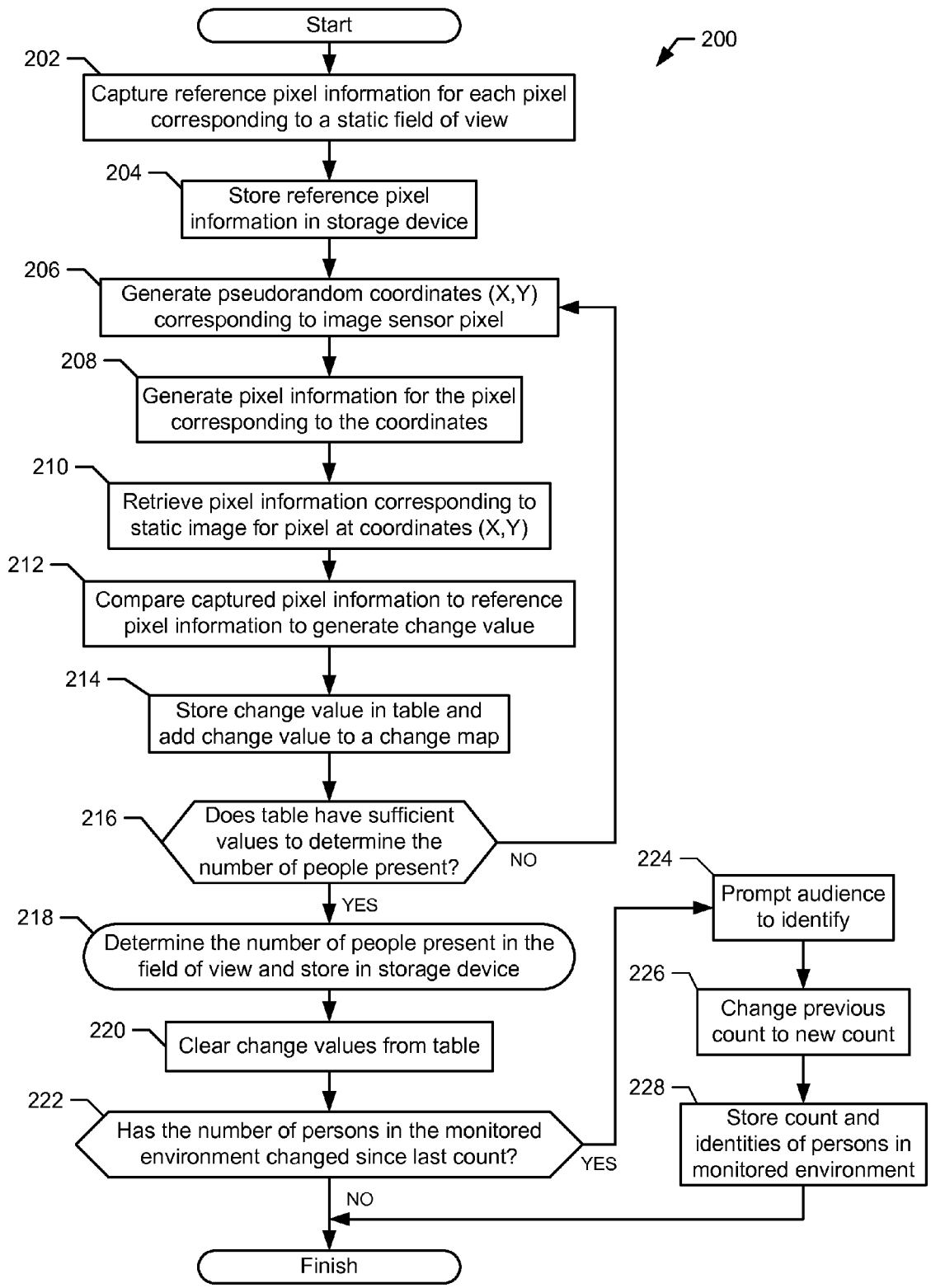
FIG. 2 is a flowchart representative of machine readable instructions which may be executed to count people in a monitored environment.

FIG. 2 is a flowchart representative of example machine readable instructions 200 which may be executed to capture pixel data representative of a monitored environment. The instructions 200 of FIG. 2 may be executed to implement the apparatus 100 of FIG. 1. As noted above, the example apparatus 100 functions to generate one or more counts of people in the monitored environment and to selectively prompt an audience to log their identities when the count of people in the environment changes.

While an example manner of implementing the apparatus 100 of FIG. 1 has been illustrated in FIG. 2, one or more of the elements, processes and/or devices illustrated in FIG. 1 may be combined, divided, re-arranged, omitted, eliminated and/or implemented in any other way. Further, the example pseudorandom number generator 106, the example reader 108, the example comparator 110, the example counter 114, the example count comparator 116, the example prompter 120 and/or, more generally, the example apparatus of FIG. 1 may be implemented by hardware, software, firmware and/or any combination of hardware, software and/or firmware. Thus, for example, any of the pseudorandom number generator 106, the example reader 108, the example comparator 110, the example counter 114, the example count comparator 116, the example prompter 120 and/or, more generally, the example apparatus 100 could be implemented by one or more circuit(s), programmable processor(s), application specific integrated circuit(s) (ASIC(s)), programmable logic device(s)

(PLD(s)) and/or field programmable logic device(s) (FPLD(s)), etc. When any of the appended claims are read to cover a purely software and/or firmware implementation, at least one of the example apparatus 100, pseudorandom number generator 106, the example reader 108, the example comparator 110, the example counter 114, the example count comparator 116, and/or the example prompter 120 are hereby expressly defined to include a tangible medium such as a memory, DVD, CD, etc. storing the software and/or firmware. Further still, the example apparatus 100 of FIG. 1 may include one or more elements, processes and/or devices in addition to, or instead of, those illustrated in FIG. 1, and/or may include more than one of any or all of the illustrated elements, processes and devices.

The example of FIG. 2 assumes there is no pixel data (e.g., in the storage device 112) available for comparing with new pixel data taken during sampling, and captures pixel information for each pixel corresponding to a static field of view of the image sensor 102 (block 202). For example, the pixel information is captured during a time when there are no people present in the field of view. The information is stored in the storage device 112 as the "previous pixel information" discussed above for later use by the comparator 110 (block 204). The blocks 202 and 204 may be performed iteratively to capture and store pixel information in rows, in columns, or by individual pixel in the storage device 112.

After the storage device 112 has received pixel information for each pixel in the field of view, the example instructions 200 of FIG. 2 begin capturing sample data. Sampling may be performed immediately following completion of block 204 or at a later time. To sample, the pseudorandom number generator 106 generates pseudorandom coordinates X,Y corresponding to a pixel 104 in the image sensor 102 (block 206). The image sensor 102 then generates pixel information for the pixel 104 corresponding to the coordinates X,Y (block 208). As discussed above, generating the pixel information may be accomplished by, for example, the image sensor 102 outputting a single pixel of data or, alternatively, outputting a block of pixel data to the reader 108, which responds by parsing the pixel data to find the pixel data corresponding to the coordinates X,Y, and generating the pixel information from the pixel data.

The reference pixel information corresponding to the static image as described above is retrieved from the storage device 110 for the pixel 104 at the coordinates X,Y (block 210). The comparator 110 then compares the new pixel information from the reader 108 to the reference pixel information from the storage device 112 to generate a change value (block 212). An example change value may be a number in a range (e.g., 1-5, 1-10, 0-255) that is generated based on how much difference exists in brightness and/or color between the new pixel information and the reference pixel information. A larger range of change values allows for greater definition in blobs generated from the change values.

After the change value is generated, the comparator 110 stores the change value in the table of change values and adds the change value to the change map (block 214). Because the pixel selection is pseudorandom, it is possible and even likely that some pixels will be selected multiple times in a relatively short period of time (e.g., between counting events). In such circumstances, the comparator 110 replaces the existing change value in the table of change values with the most recent change value for the same coordinates. The replacement of the change value in the table results in a corresponding replacement in a change map based on the table. If there is no existing change value in the table, the comparator 110 stores the new change value using the coordinates.

After the new change value is stored and the change table updated (block 214), the counter 114 then determines whether the table (or change map) has a sufficient number of change values (i.e., sufficient coverage) to validly count the number of people present in the field of view (block 216). In the illustrated example, the counter 114 determines that more values are needed if less than 800,000 pixels (i.e., 80%) of a 1000×1000 pixel field of view have associated change values. However, another coverage value (e.g., 40%, 50%, 60%) may be more appropriate. Full (100%) coverage would take a very long time to achieve using pseudorandom coordinate selection and, thus, is not likely to be a good choice. After a sufficient number of change values have been recorded (block 216), the remaining change values may be filled in by, for example, interpolating the nearby change values to generate the missing change values as described below. If the table does not have a sufficient number of change values (block 216), control reverts to block 206 to generate new pseudorandom coordinates. The blocks 206-220 iterate until a number of change values sufficient to determine the number of people present in the field of view of the image sensor 102 have been stored (block 216). Control then advances to block 218.

When the counter 114 determines that the table has a sufficient number of change values (block 216), the counter 114 counts the number of people present in the field of view of the image sensor 102 and stores the number in the storage device 110 (block 222). The apparatus 100 may store other useful information associated with the number of people, such as a time/date stamp or a presented media program. When the information is stored in the storage device 110, the counter 114 clears the table of change values to prepare for another scan or count (block 220). Next, the count comparator 116 determines whether the new count is equal the previous count 118 (block 222). If the count has changed from the previous count 118, the prompter 120 prompts the audience members to identify themselves (block 224). The count comparator 116 also updates the previous count 118 to equal the new count determined by the counter 114 (block 226). The prompter 120 then stores the new count and identifiers for the audience members in the storage device 112 (block 228). When the identifiers have been stored, or if the count comparator 116 determines the new count has not changed from the previous count 118, the process 200 may finish. The counter 114 may then end or iterate to generate another count. Because the reference pixel information is maintained, subsequent iterations begin at block 206 to continue to monitor the monitored environment.

Figure 3:
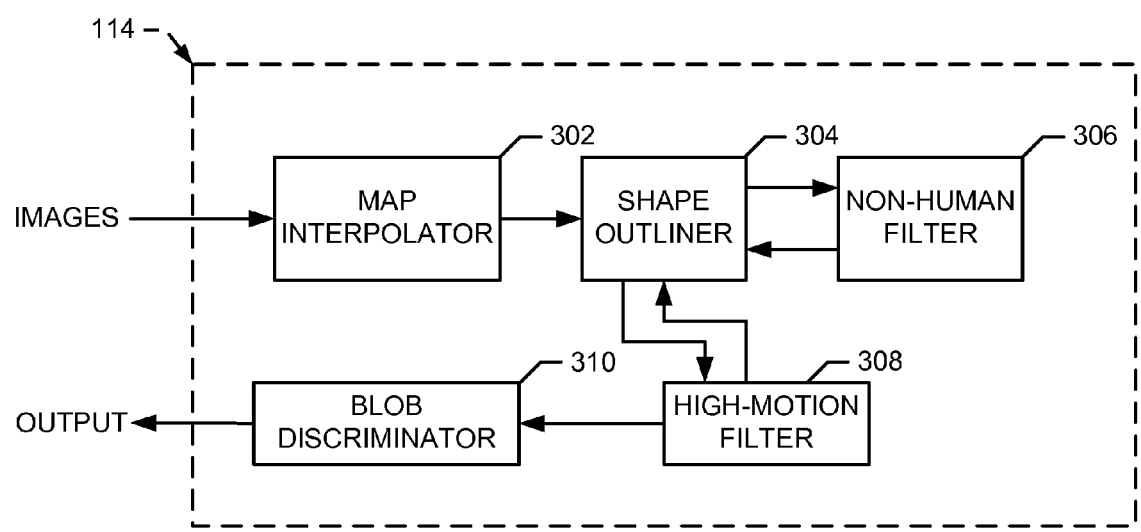
FIG. 3 is a block diagram of an example device to implement the counter described in FIG. 1.

FIG. 3 is a block diagram of the example counter 114 of FIG. 1. The counter 114 receives change values or a change map from the storage device 112, and outputs a count of people present in the field of view of the image sensor 102. The counter 114 includes a map interpolator 302, which interpolates pixels in the received change value table or map to fill in missing change values from change values of nearby pixels.

In the example of FIG. 3, the pixels in the change map are digitized such that the change value for each pixel is assigned an 8 bit binary value (i.e., a value of 0-255) which is representative of the difference between the previous pixel information and the new pixel information for a given pixel. Thus, each change map can be thought of as an array of digital data, with each element contained in the array corresponding to an 8 bit binary value.

In the illustrated example, each change map may be thought of as a collection of motion points localized around center(s) of motion. In order to correlate these motion points to objects in the images, the counter 114 is provided with a shape outliner 304. The shape outliner 304 employs a process such as the convex hull algorithm to draw shapes or blobs encompassing the motion points. The convex hull algorithm joins all points in a set of points that satisfy a predetermined constraint into a blob or shape. The predetermined constraint may be a requirement that all of the points in the blob or shape are separated by less than a predetermined distance. Since in this example, we are attempting to identify humans, the predetermined distance should be a distance corresponding to the size of a human being. This distance may be a settable or programmable parameter and may be set based on the sizes of the expected audience members at a given household.

The shape outliner 304 of the illustrated example operates on the interpolated map corresponding to the change values being analyzed to draw blob(s) within the interpolated map via the process explained above. Operating on the interpolated map rather than directly on the change value table or map provides the shape outliner 304 with a complete change map on which to outline shapes.

The example map interpolator 302 and the example shape outliner 304 of FIG. 3 function to reduce the problem of counting people appearing in an image to counting blob(s) reflecting center(s) of motion within an image.

For the purpose of discriminating human blob(s) appearing within the interpolated map from non-human blob(s) (e.g., pets, random noise, inanimate objects, etc.), the counter 114 is further provided with a non-human filter 306. In the illustrated example, the non-human filter 306 analyzes the shape(s) drawn within the interpolated map by the shape outliner 304 to determine if any can be eliminated from the interpolated map as not possibly corresponding to a human being. The non-human filter 306 may employ any logical test to eliminate blob(s) from the interpolated map. For example, the non-human filter 306 may test the location(s) of the blob(s) to determine if their location(s) identify them as not human. For instance, a blob located on the ceiling of a room can be eliminated as not human. In addition to location based tests, the non-human filter 306 may also test the size of the shape. For example, if the size of a blob is beneath a certain threshold or above a certain threshold, it may be eliminated as not reflecting a human sized object. The tests performed by the non-human filter 306 may be adjusted to suit the environment being analyzed. For example, in a household with children, the non-human filter 306 may employ a lower size threshold than a household with no children. Similarly, in a household with no children, the non-human filter 306 may identify blob(s) appearing on the floor as non-human, whereas it may not be allowed to identify blob(s) on the floor as non-human based purely on a floor location if the household includes children. If the test(s) employed by the non-human filter 306 are to be tailored to the demographics of the household being analyzed, the test(s) should be adjusted at set up of the counter 114.

The non-human filter 306 may eliminate a blob from the interpolated map in many different ways. For example, the binary values in the interpolated map giving rise to the object being eliminated can be zeroed, and the revised interpolated map fed back to the shape outliner 304 to create a new set of blob(s) in the interpolated map excluding the blob(s) eliminated by the non-human filter 306.

The counter 114 may further include a high-motion filter 308 to assist in detection of high-motion events. An example high-motion event may be changing the light level in the monitored environment. Since the detected brightness of every pixel in the image sensor 102 changes when the light level is changed, the change value for every pixel has a substantially uniform change offset. The offset may be detected and filtered by the high-motion filter 308 to more accurately determine whether the blob(s) represent present person(s).

For the purpose of determining if any of the blob(s) appearing in the interpolated map (optionally, as filtered by the non-human filter 306 and/or the high-motion filter 308) represent person(s), the counter 114 is further provided with a blob discriminator 310. The blob discriminator 310 uses image processing techniques to discern and count blobs in the change map. Using a high-resolution device for the image sensor 102 and a sufficient range for change values (e.g., 8 bits), the blob discriminator 310 can use techniques such as edge detection to discriminate between overlapping blobs (e.g., one person standing in front of another) and count the total number of distinct blobs in the change map. The blob discriminator 310 outputs a count of people to the storage device 112 of FIG. 1 and/or the count comparator 116.

Figure 4:
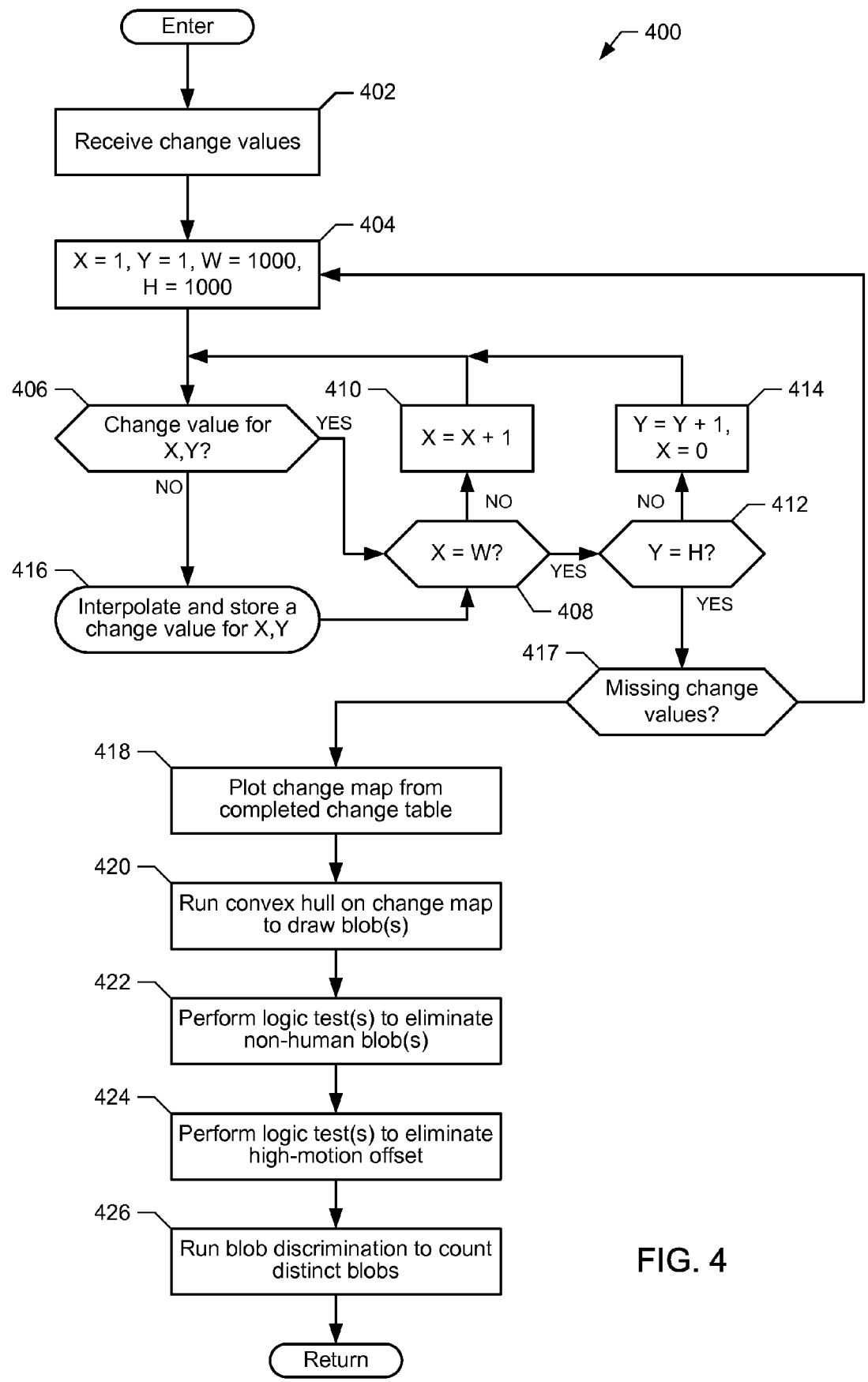
FIG. 4 is a flowchart representative of machine readable instructions which may be executed to determine a number of people in the field of view of an image sensor.
Figure 5:
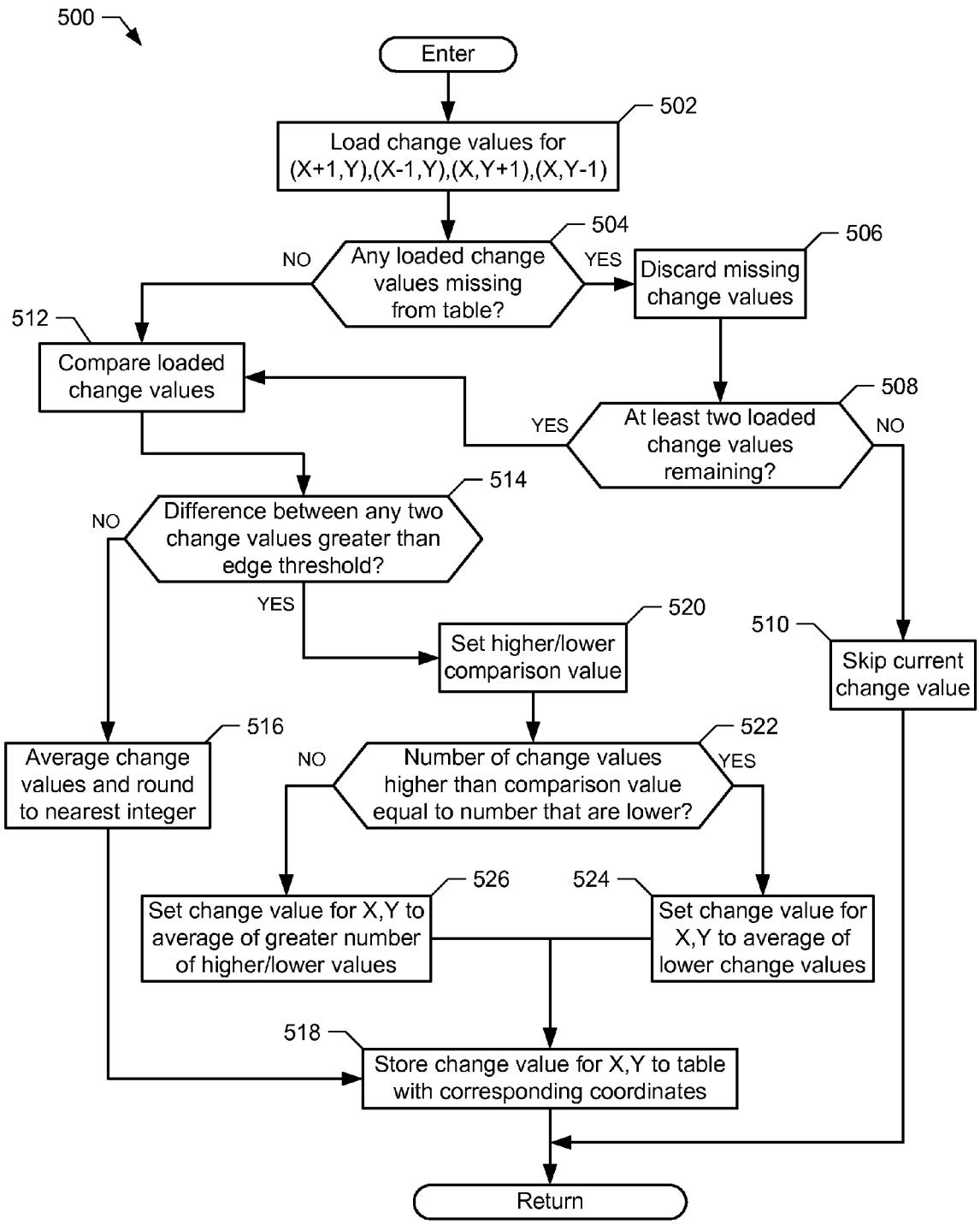
FIG. 5 is a flowchart representative of machine readable instructions which may be executed to interpolate a change value in a table of change values.

While an example manner of implementing the counter 114 of FIG. 3 are illustrated in FIGS. 4 and 5, one or more of the elements, processes and/or devices illustrated in FIGS. 4 and 5 may be combined, divided, re-arranged, omitted, eliminated and/or implemented in any other way. Further, the map interpolator 302, the shape outliner 304, the non-human filter 306, the high-motion filter 308, the blob discriminator 310 and/or, more generally, the example counter 114 of FIG. 3 may be implemented by hardware, software, firmware and/or any combination of hardware, software and/or firmware. Thus, for example, any of the map interpolator 302, the shape outliner 304, the non-human filter 306, the high-motion filter 308, the blob discriminator 310 and/or, more generally, the example counter 114 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example counter 114, the map interpolator 302, the shape outliner 304, the non-human filter 306, the high-motion filter 308, and/or the blob discriminator 310 are hereby expressly defined to include a tangible medium such as a memory, DVD, CD, etc. storing the software and/or firmware. Further still, the example counter 114 of FIG. 3 may include one or more elements, processes and/or devices in addition to, or instead of, those illustrated in FIGS. 4 and 5, and/or may include more than one of any or all of the illustrated elements, processes and devices.

The example instructions 400 and 500 of FIGS. 4 and 5 may be used with the process 200 of FIG. 2 to implement the apparatus 100. If so implemented, the example instructions 400 of FIG. 4 replaces block 222 of FIG. 2. However, the example instructions of FIG. 4 could be implemented without the example instructions 200 of FIG. 2 or vice versa. For example, the example instructions of FIG. 2 could use an entirely different method of determining a number of people in a field of view from a table of change values and/or the example instructions of FIG. 4 could be used for applications other than audience measurement. In the following, it is assumed that the program of FIG. 4 is used in the program of FIG. 2. Therefore, in this example, control enters the program of FIG. 4 via block 220 of FIG. 2.

Turning to FIG. 4, the example instructions 400 begin when the table has sufficient values to determine the number of people present in the field of view of the image sensor 102 (block 220). The counter 114 receives the table of change values from the storage device 112 (block 402). The counter 114 then initializes coordinate variables X and Y, and sets a width value W and a height value H corresponding to the width and height in pixels of the image sensor 102. The example image sensor 102 of FIG. 1 includes a 1000×1000 pixel image sensor, so W and H are each set to 1000 in the example of FIG. 4.

The map interpolator 302 then checks and, if necessary, interpolates each pixel in the field of view of the image sensor 102. The example map interpolator 302 first checks for a change value corresponding to the coordinates X,Y (e.g., 1,1) (block 406). If a change value is present in the table for the coordinates X,Y, the map interpolator 302 checks whether X has reached the maximum X value of W (block 408). If X has not reached its maximum value (e.g., W, 1000), X is incremented by one (block 410) and control returns to block 406 to check the next pixel in the row of pixels. If, at block 408, X has reached the maximum value, the map interpolator 302 determines whether Y has reached its maximum value of H (block 412). If Y has not reached H, Y is incremented by one and X is set to one (block 414), and control is passed to block 406 to check for a change value for the next pixel.

If the map interpolator 302 finds that there is not a change value for a pixel at block 406, the map interpolator 302 generates a change value by interpolating nearby change values (block 416). Example instructions which may be executed to interpolate the change value are described in FIG. 5. The generated change value is stored in the change value table with the corresponding coordinates X,Y, and control passes to block 408. Blocks 406-416 are iterated to interpolate missing values for the entire change value table.

When both X and Y have reached their maximum values (block 412), every pixel in the table has been checked for a change value and interpolated, if necessary. The map interpolator 302 checks the table to determine if any missing change values were not interpolated (i.e., skipped) (block 417). If there are any missing change values, control passes to block 404 to recheck the table of change values and interpolate any change values that may have been previously skipped. If all pixels have associated change values present in the table, the map interpolator 302 plots a change map from the table of change values (block 418). The change map includes a change value (e.g., 0-255) for each pixel, regardless of whether the change value was generated by the comparator 108 or the map interpolator 302. An example change map may resemble a heat map or contour map, if each possible change value is assigned a shade of gray (e.g., 255=white, 0=black, and a linear spectrum of gray is assigned between 0 and 255).

At block 420, the shape outliner 182 executes the convex hull process on the points appearing in the interpolated map. As explained above, if any points are present in the interpolated map, the execution of the convex hull process draws one or more blob(s) in the interpolated map.

Once the blob(s) (if any) are drawn, the non-human filter 306 performs one or more logic test(s) on the blob(s) to attempt to eliminate non-human blob(s) from the interpolated map (block 422). As explained above, many different logic tests may be used for this purpose including, by way of examples, not limitations, a location test and/or a size test.

When the non-human filter 306 has completed execution, high-motion filter 308 performs one or more logic test(s) to eliminate any high-motion offset that may exist in the interpolated map (block 424).

When the interpolated map has been filtered (block 424), the blob discriminator identifies and counts distinct blobs in the interpolated map (block 426). As described above, blob discrimination may be accomplished via edge detection and/or other image analysis techniques. The example machine readable instructions then terminate and control returns to block 224 of FIG. 2.

FIG. 5 is a flowchart illustrating example machine readable instructions 500 which may be executed to interpolate a change value in a table of change values. The example machine readable instructions 500 may be used to implement block 416 of FIG. 4 to interpolate and store a change value for X,Y. In this case, the machine readable instructions 500 are called from block 406 when there is no change value for a coordinate X,Y. The example machine readable instructions 500 implement the map interpolator 302. The map interpolator 302 loads change values corresponding to coordinates (X+1, Y), (X−1,Y), (X,Y+1), and (X,Y−1) from the change value table (block 502). Because it is possible that there are not values in the change table for one or more of the coordinates, the map interpolator 302 then determines whether any of the values are missing (block 504). For example, a table lookup of a coordinate may result in a <NULL> value or an exception. Additionally, a pixel on the edge of the coordinate map does not have an adjacent pixel in at least one direction.

If any of the values are missing, the map interpolator 302 discards the values and the corresponding coordinates (block 506). When the missing value(s) are discarded, the map interpolator 302 checks whether there are at least two of the loaded values remaining that have not been discarded (block 508). If there are less than two values remaining, the map interpolator 302 skips the current change value at X,Y (block 510) and control returns to block 408 of FIG. 4. The skipped change value may be later interpolated by another iteration of blocks 404-416.

If there are no loaded change values missing (block 504) or if there are at least two remaining change values (block 508), the map interpolator 302 continues by comparing the loaded change values (block 512). An example comparison may include determining a difference between each pair of change values. The differences are then compared to an edge threshold value, which is a value indicative of a significant change in a short distance (block 514). For example, if a pixel with a change value of 250 is adjacent to a pixel with a change value of 150, the difference may be indicative of multiple adjacent blobs. Thus, if all the change values are relatively close to each other, there is not likely to be an edge, and the map interpolator 302 averages the change values and rounds to the nearest integer (block 516). This value is then stored in the change value table with the corresponding coordinates (block 518), and control returns to block 408 of FIG. 4.

In contrast, if there is a significant difference between two or more change values, the map interpolator 302 sets a comparison value to be representative of a comparison point or a comparison range (block 520). The change values are each compared to the comparison point to determine how many change values are higher than the comparison point and how many change values are lower than the comparison point. If a comparison range is used (e.g., the comparison point+/− 0.25*the edge threshold value), the map interpolator 302 may determine how many change values are higher than and lower than the comparison range, and discount any change values that lie within the range. The map interpolator 302 then compares the number of change values that are higher than the comparison value with the number of change values below the comparison value (block 522).

If the number of higher values is equal to the number of lower values, the example map interpolator 302 sets the change value for X,Y to the average of the lower values (block 524). The change value may be set to the average of the lower values to avoid artificially high change values indicative of persons. However, it should be recognized that the example map interpolator 302 may be modified to set the change value differently based on the application. In contrast, if the number of higher values is not equal to the number of lower values (block 522), the map interpolator 302 sets the change value for X,Y to the average of the higher or lower values based on whether there are more higher or lower values (block 526). In other words, if there are more change values that are higher than the comparison value, the map interpolator 302 sets the change value for X,Y to the average of the higher values. After the change value for X,Y is set at block 524 or block 526, the process stores the change value for X,Y with the corresponding coordinates to the change value table (block 518) and control returns to block 408 of FIG. 4.

Although example decisions and values are shown in the example of FIG. 5, it should be noted that the example instructions 500 of FIG. 5 may be modified, replaced, or omitted in many different ways. For example, block 502 may be modified to load change values from a 2-pixel radius or any other set of change values that may be representative of the missing change value. Alternatively, the instructions 500 of FIG. 5 may be replaced by another method of interpolating change values.

Figure 6:
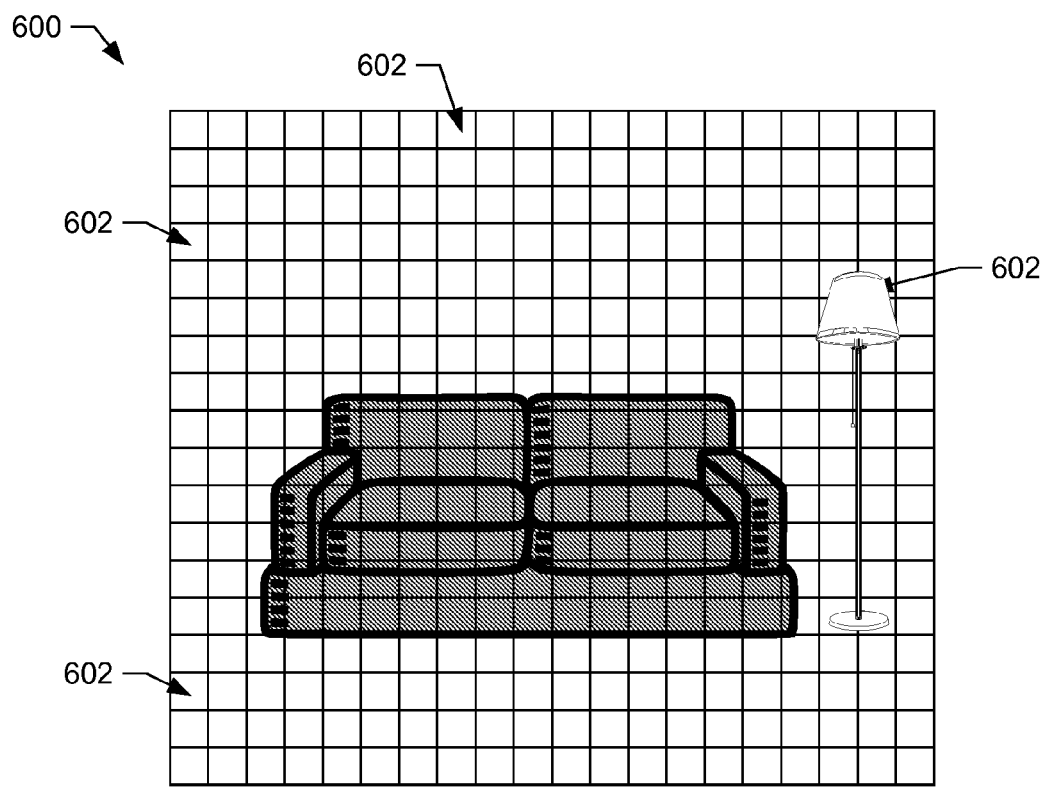
FIG. 6 illustrates an example field of view of an image sensor when a monitored household environment has no people present.

FIG. 6 illustrates an example field of view 600 of an image sensor 102 when a monitored household environment has no people present. The field of view 600 includes many sample points 602, where each sample point 602 corresponds to a pixel 104. For simplicity, the example field of view 600 includes a 20 pixel by 20 pixel field of view. However, other examples may include many more pixels in both height and width. The example field of view 600 of FIG. 6 may be representative of a household family television room, where the image sensor 102 is placed near the television and is configured to view people that are located in positions to view the television. Other configurations of the image sensor 102 are also capable of capturing the television viewing area.

Figure 7:
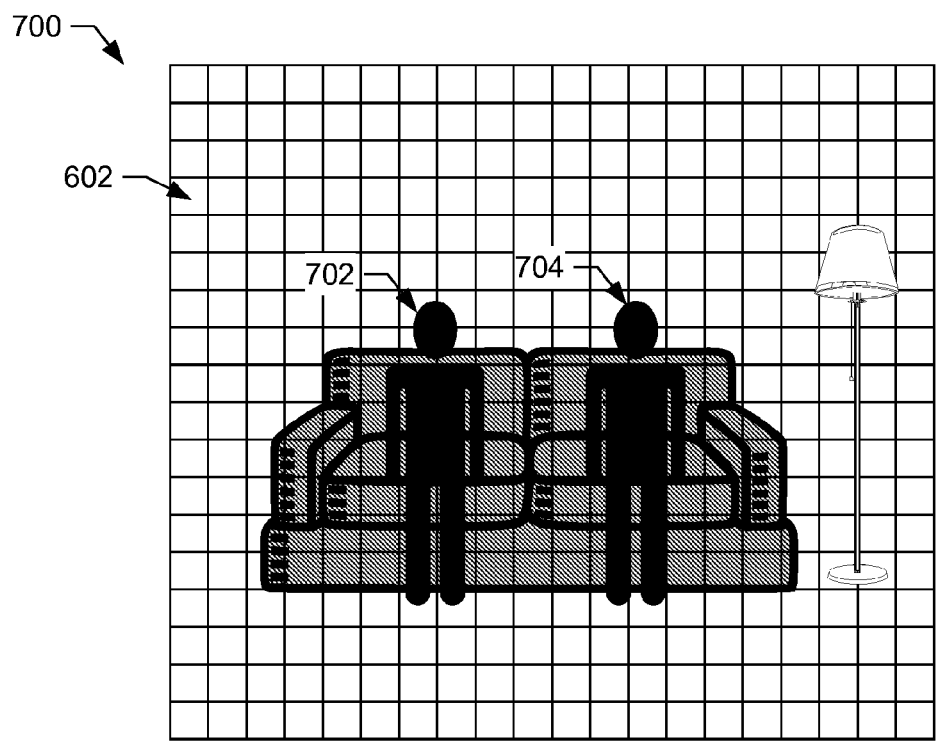
FIG. 7 illustrates the example field of view of FIG. 6 when there are people present in the monitored household environment.
Figures 8, 9:
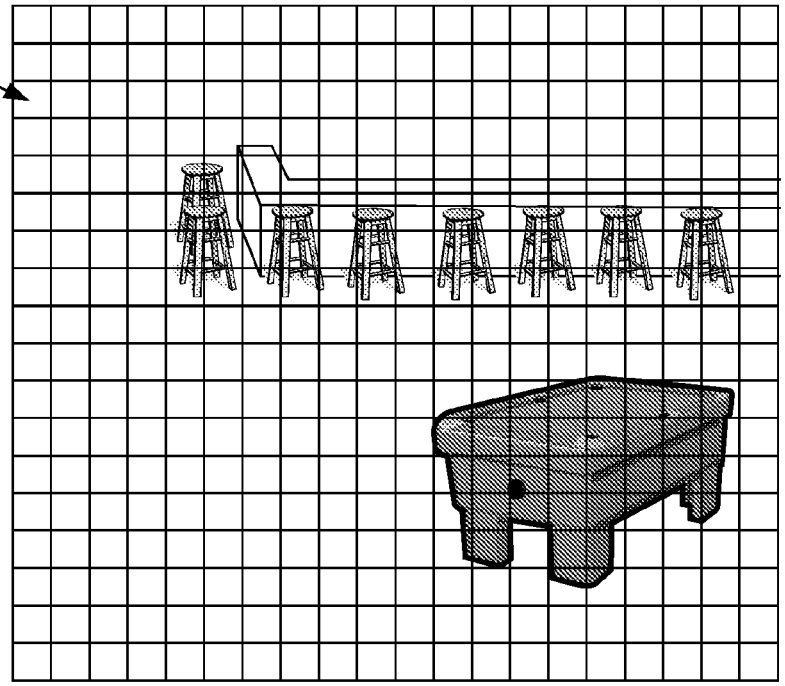
FIG. 8 illustrates an example change map resulting from a comparison of corresponding pixels from the respective fields of view of FIGS. 6 and 7.
FIG. 9 illustrates an example field of view of an image sensor when a room of a commercial establishment is empty.

FIG. 7 is an illustration of the example field of view 700 of the image sensor 102 when there are people present in the monitored household environment of FIG. 6. The example field of view 700 corresponds to the field of view 600 of FIG. 6. There are two people 702 and 704 located in the field of view 700, and the bodies of the people 702 and 704 are divided among the sample points 602 (i.e., pixels). When the example apparatus 100 of FIG. 1 performs a scan, many of the sample points 602 are sampled by the apparatus 100 to form a table of change values and a change map as described above. An example change map 800 that may be generated by comparing pixels in the field of view 700 with the corresponding pixels of the field of view 600 is shown in FIG. 8. For simplicity and clarity, the change map 800 shows the change values (range 0-5) and shades of gray corresponding to the change values, with 0 being white and 5 being black. However, the range of change values may be greater (e.g., 0-255) and/or the number of pixels in the field of view may be greater (e.g., thousands/millions). The change map 800 and/or the change values used to create the change map 800 may be used by the counter 114 to determine the number of people in the field of view 700.

FIG. 9 illustrates an example field of view 900 of an image sensor when a room of a commercial establishment is empty. Similar to the field of view 600 of FIG. 6, the field of view 900 includes sample points 602 from which to retrieve pixel data. The field of view 900 may be representative of the field of view of the image sensor 102 of the apparatus 100 when placed within the commercial establishment (e.g., a bar or restaurant). In an audience research application, the apparatus 100 may be oriented such that the field of view 900 of the image sensor 102 includes most or all of the area where people may be exposed to media.

Figures 10, 11:
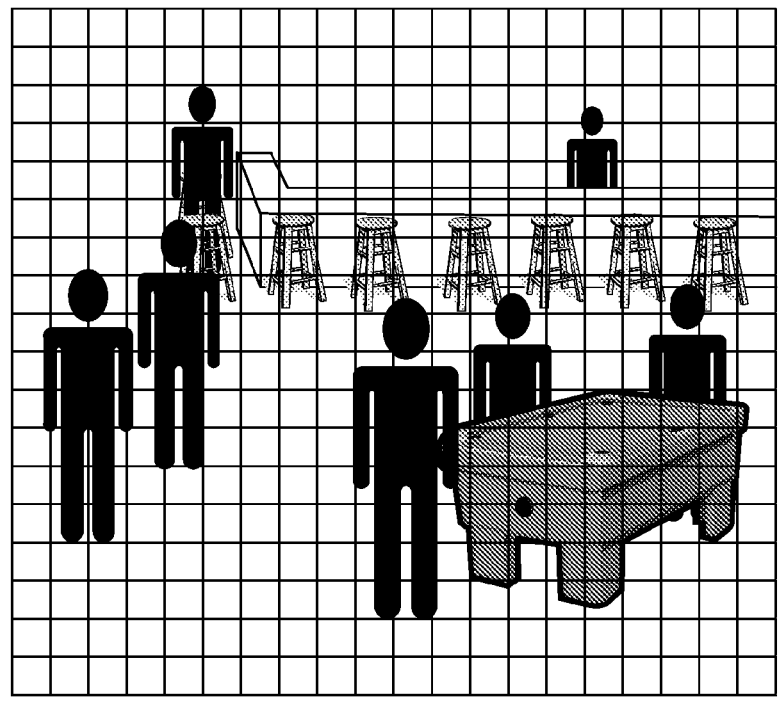
FIG. 10 illustrates the example field of view of FIG. 9 when there are people present in the room of the commercial establishment.
FIG. 11 illustrates an example change map resulting from a comparison of corresponding pixels from the respective fields of view of FIGS. 9 and 10.

FIG. 10 illustrates an example field of view 1000 of the example image sensor 102 when there are people present in the room of the commercial establishment. An example change map 1100 that may be generated from a comparison of pixel information from the fields of view 900 and 1000 is shown in FIG. 11. The blob(s) 1102 are shown as overlapping blobs that are determined to be distinct persons by the blob discriminator 310. It should be noted that many example applications will include much higher resolution in the change map than the example change map 1100, and will allow for better determination of distinct persons from overlapping blobs.

Figures 12, 13:
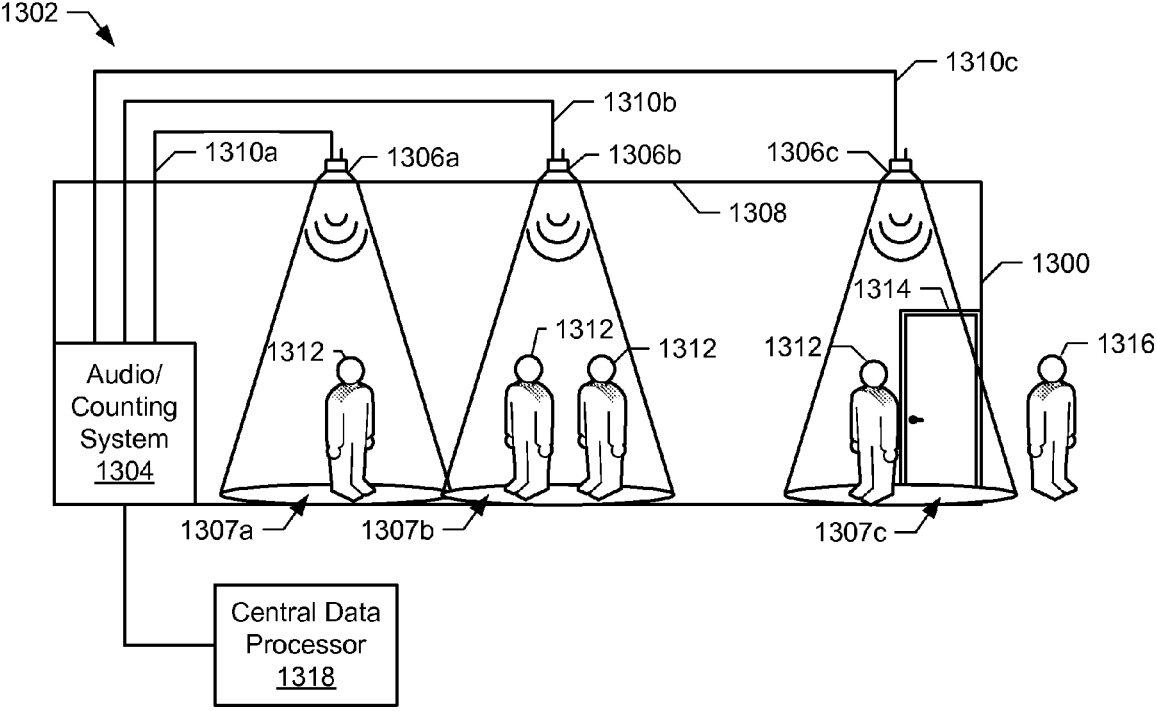
FIG. 12 illustrates example table to store pixel information and change values in a storage device.
FIG. 13 is a block diagram of a commercial space implementing the example smart speaker system described herein.

FIG. 12 illustrates an example table 1200 to store pixel information and change values in a storage device. The table 1200 includes data organized by coordinates corresponding to the image sensor (e.g., the image sensor 102 of FIG. 1). Table data may be organized into rows, sorted for fast retrieval, or may be organized and/or sorted in other ways based on the application. The example table 1200 is stored in the storage device 112 of FIG. 1, and may be modified and/or retrieved by the comparator 110 and/or the counter 114.

FIG. 13 is a block diagram of an example monitored space 1300 in which the example smart speaker system 1302 described herein is implemented. The example monitored space 1300 of FIG. 13 is equipped with a speaker system to deliver audio to persons within the monitored space 1300, such as public announcements, music, television, or motion picture audio. The example monitored space 1300 may be a retail store, grocery store, restaurant, theme park, movie theater, university, airport, tavern, elevator, business, hotel, amusement facility, sporting stadium, or any other commercial establishment where audio may be provided by a speaker system. While the example speaker systems described below are located overhead, speaker systems may be modified for other speaker system locations and/or orientations.

In addition to delivering audio, the speaker system 1302 of FIG. 13 is configured to collect data to determine relevant information about the persons within the monitored space 1300. To this end, the example speaker system 1302 includes an audio and counting system 1304 and several smart speakers 1306a, 1306b, and 1306c. In some examples, one or more of the example smart speakers 1306a-1306c are ordinary speakers that are retrofitted with a people counters, such as a one or more cameras, image sensors, and/or other people counters. In some other examples, one or more of the example smart speakers 1306a-1306c are speakers manufactured as speakers that include one or more people counters. As illustrated in FIG. 13, the smart speakers 1306a-c are mounted overhead in the ceiling 1308 of the monitored space 1300 and the respective fields of view are located below the smart speakers 1306a-c. As described below, the audio and counting system 1304 may deliver audio signals to one or more of the smart speakers 1306a-c and receive data signals from the smart speakers 1306a-c. The example audio and counting system 1304 may additionally send control signals to one or more of the smart speakers 1306a-c for configuration or other control functions.

To conduct signals between the audio and counting system 1304 and the smart speakers 1306a-c, the example speaker system 1302 includes one or more wired or wireless connections 1310a-c. If wired connections 1310a-c are used, the wired connections 1310a-c may be implemented using coaxial cable, twisted pair speaker wire, or any other type of wired connection.

The smart speaker system 1302 is generally configured to collect and process data (e.g., image data, people counting data) regarding one or more persons 1312 entering the monitored space 1300, exiting the monitored space 1300, and/or moving about within the monitored space 1300. In the illustrated example, a smart speaker 1306c is located above an entrance and/or an exit door 1314 to collect data representative of the number of persons 1312 within the monitored space 1300 at any given time. This data, coupled with time data created by time stamping the people counts, can be used to identify consistently busy periods for the monitored space 1300. Additionally or alternatively, a smart speaker 1306c may collect data representative of persons 1316 that walk past the entrance and/or exit door 1314 without entering the monitored space 1300. This data may be used to identify a percentage of passersby who enter the monitored space 1300.

In the illustrated example, each of the smart speakers 1306a-c is configured with an image sensor and/or people counting device to determine a count of person(s) 1312 within the smart speaker's 1306a-c field of view 1307a-c. Additionally or alternatively, a smart speaker 1306a may determine the height(s) of person(s) 1312 within its field of view 1307a-c, the location(s) of person(s) 1312 within the monitored space 1300, the velocit(ies) of travel of person(s) 1312 within the monitored space 1300, the traveling direction(s) of person(s) 1312 within the monitored space 1300, area(s) of interest to person(s) 1312 within the monitored space 1300, demographic characteristic(s) of person(s) within its field of view, and/or other data regarding persons 1312 that may be useful to a commercial establishment. The audio and counting system 1304 collects data from multiple smart speakers 1306a-c. The collected data is processed by the audio and counting system 1304 and/or by a remote central data processor 1318. Statistical data about person(s) in the commercial space may be determined based on the data collected at the audio and counting system 1304. Using multiple smart speaker to collect data results in a more robust data set and, thus, a broader range of statistics and/or trends that can be determined.

The audio and counting system 1304 communicates with a central data processor 1318 to transmit the collected data at periodic (e.g., predetermined) or aperiodic (e.g., upon occurrence of certain events such as a collection of a threshold amount of data) intervals. The central data processor 1318 of the illustrated example is a remotely-located processing system to process and/or store people-counting data collected by counting systems at one or more commercial spaces. Alternatively, the central data processor 1318 may be located at or near the monitored space 1300 to process and/or store the data locally. After processing the data, the central data processor 1318 of the illustrated example generates a report or other human-readable instrument based on the collected data. The report is representative of human behavior associated with the commercial establishment.

Figure 14:
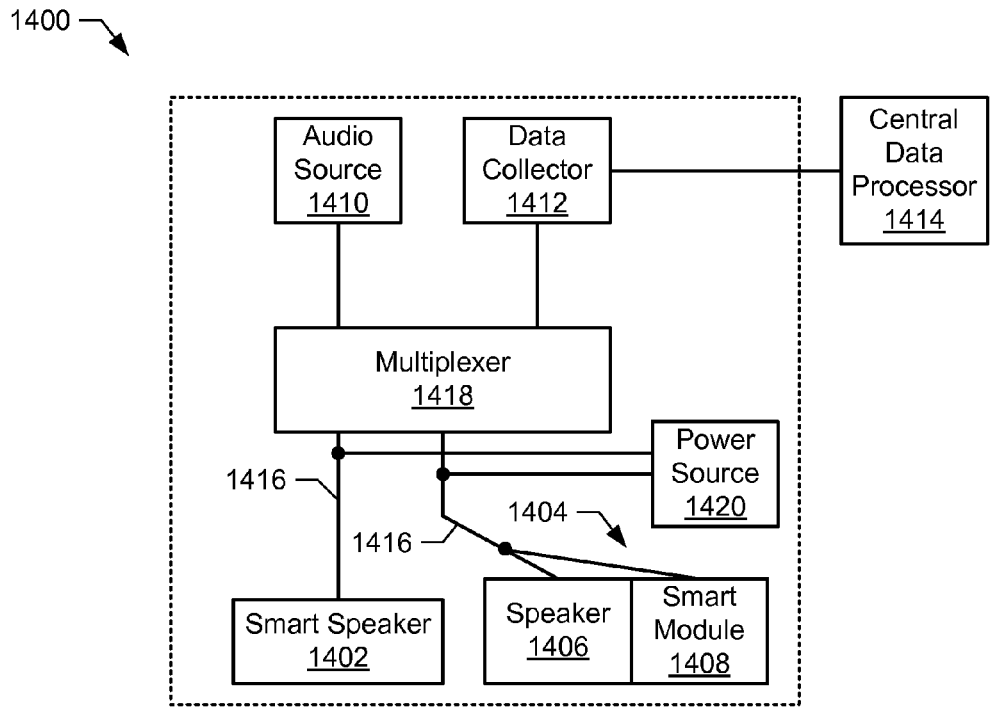
FIG. 14 is a block diagram of an example smart speaker system in a home-run speaker configuration that may be used to count persons in a commercial space.

FIG. 14 is a block diagram of an example smart speaker system 1400 in a home-run speaker configuration that may be used to count persons in a monitored space. The example smart speaker system 1400 illustrates an example way to implement the example smart speaker system 1302 described in FIG. 13.

The example smart speaker system 1400 includes one or more smart speakers 1402 and 1404. The smart speakers 1402 and 1404 may be installed in place of speakers belonging to an existing audio system serving, for example, a commercial space. Alternatively, a smart module 1408 may be coupled to an existing speaker 1406 of an audio system to convert an existing speaker into a smart speaker 1404. The example smart module 1408 includes one or more of a people counter (e.g., a camera, an image sensor, etc.), a processing unit, memory to support the processing unit, and/or a communications unit.

To provide the smart speakers 1402 and 1404 with audio, the example smart speaker system 1400 includes an audio source 1410. The audio source 1410 may be any type of audio source, such as a public address system, a music player, or a combination of audio sources. In a new smart speaker system 1400 installation, the audio source 1410 is installed with the smart speakers 1402 and 1404. In contrast, in a replacement installation, the audio source 1410 may already be present and does not need to be replaced. An example audio source is an existing audio system designed and/or installed by Muzak or other providers. Often, such providers have experience and tools for cost-efficiently installing audio systems, which may further reduce installation costs and complexity with respect to current installation procedures.

To receive data collected by the smart speakers 1402 and 1404, the example smart speaker system 1400 further includes a data collector 1412. The example data collector 1412 may also determine statistical data based on the received data, aggregate the received data from all smart speakers 1402 and 1404, and/or forward the collected data to a central data processor 1414 for processing.

As mentioned above, the audio source 1410 and the data collector 1412 may communicate with the smart speakers 1402 and 1404 via the same respective connections 1416 (e.g., the connections 1310a-c of FIG. 13). Using the same connections 1416 for the audio source 1410 and the data collector 1412 can significantly reduce the installation complexity and costs for the smart speaker system 1400. To enable both the audio source 1410 and the data collector 1412 to use the same connections 1416, the example smart speaker system 1400 includes a multiplexer 1418 coupled to the audio source 1410, the data collector 1412, and the smart speakers 1402 and 1404. In the example of FIG. 14, the smart speakers 1402 and 1404 are communicatively coupled to the multiplexer 1418 and, therefore, to the audio source 1410 and data collector 1412, via "home-run" connections. That is, each smart speaker 1402 and 1404 may be coupled to separate ports on the multiplexer 1418.

The example multiplexer 1418 receives audio signals from the audio source 1410 and data signals from the data collector 1412, and multiplexes the signals to one or more of the smart speakers 1402 and/or 1404. Multiplexing the signals may occur using, for example, time division multiplexing and/or frequency division multiplexing. Similarly, the multiplexer 1418 receives data from the smart speakers 1402 and 1404 via the connections 1416, and transmits the data to the data collector 1412.

A power source 1420 is also included in the example smart speaker system 1400 to provide power to the smart speakers 1402 and 1404. Generally, the audio speakers do not require power from the power source 1420, as they are driven by the audio source 1410. However, the smart speakers 1402 and 1404 may include audio data receivers, audio processors, and/or audio amplifiers to receive audio data from the audio source 1410 and drive the speaker portion(s) (e.g., the speaker 1406) of the smart speaker(s) 1402 and/or 1404. The power source 1420 provides power to the people-counting portion of the smart speakers (e.g., sensors, data processors, the smart module 1408). Additionally, the power source 1420 may be configured to provide power to the audio source 1410 and/or the data collector 1412.

In operation, the example smart speaker system 1400 provides audio signals to the smart speakers 1402 and 1404 via the audio source 1410, the multiplexer 1418, and the connections 1416. While the smart speakers 1402 and 1404 are broadcasting audio corresponding to the audio signals within the monitored space, the smart speakers 1402 and 1404 collect data, such as image data, representative of persons within respective fields of view. The example smart speaker 1402 processes the collected data to determine one or more of a count of persons within the field of view (e.g., the fields of view 1307a-c of FIG. 13) and/or characteristics of the persons within the field of view. Such example characteristics may include the travel path(s) of person(s) (e.g., the persons 1312 of FIG. 13) within the monitored space, the height(s) of the person(s), the location(s) of the person(s), the travel velocit(ies) of the person(s), direction(s) of movement for the person(s), area(s) of interest to the person(s), and/or other data regarding the persons. Some of these characteristics may be developed from two or more smart speakers and, thus, may be collected at the data collector 1412 and/or the central data processor 1414. In some examples, any one or more of the collection of data, processing of the data, and/or determination of characteristics of person(s) may be performed by the smart module 1408.

After collecting and/or processing the data, the example smart speaker 1402 transmits the collected and/or processed data to the data collector 1412 via the connections 1416 and the multiplexer 1418. The example smart speaker 1404 equipped with a smart module 1408 transmits the collected and/or processed data to the data collector 1412 via the smart module. Thus, the example smart speaker 1402 receives audio and transmits data via the same connection 1416.

The data collector 1412 receives the processed data from the smart speakers 1402 and 1404. The data collector 1412 may process the data from one or more smart speakers to generate aggregated data. Such aggregated data may reflect trends of customer activity. Identifying these trends may assist the store in making decision(s) to, for example, promote or move particular items, provide additional staff or reduce staff to a particular area of the monitored space, or beneficially arrange or re-arrange the monitored space.

Additionally, the data collector 1412 may monitor persons traveling through the fields of view of different smart speakers 1402 and 1404. By monitoring characteristic data for a person, such as height, location, travel velocity, and travel direction, using multiple smart speakers 1402 and 1404, the data collector 1412 may correlate characteristic data to determine a probability that a person counted at a first time by a first smart speaker 1402 is the same person that is counted by the second smart speaker 1404 at a second time, thereby accurately determining that person's path through the commercial space. Such a probability may factor in one or more of: the distance between the fields of view of the respective smart speakers 1402 and 1404, velocity(ies) and direction(s) of the person(s) in question at the respective times, and/or the difference between the times.

Upon the occurrence of one or more event(s) and/or time(s), the data collector 1412 forwards the aggregated data to the central data processor 1414 for storage and/or additional processing. The central data processor 1414 of the illustrated example processes the data received from the smart speaker system 1400 in a first monitored space (e.g., the commercial space 1300 of FIG. 13) with data received from additional smart speaker systems in similar commercial spaces to determine larger statistical trends.

Figure 15:
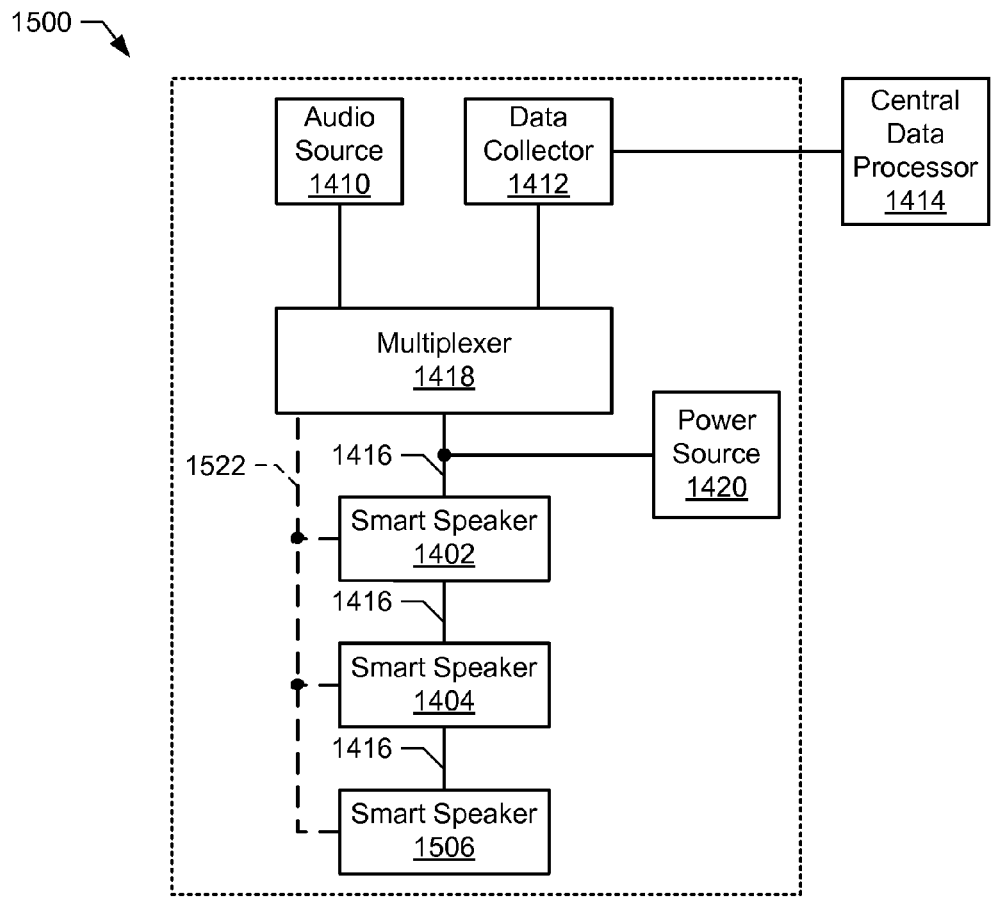
FIG. 15 is a block diagram of another example smart speaker system in a daisy-chain configuration that may be used to count persons in a commercial space.

FIG. 15 is a block diagram of another example smart speaker system 1500 in a daisy-chain configuration that may be used to count persons in a monitored space. The example smart speaker system 1500 includes similar components to those of the smart speaker system 1400 described in FIG. 14, including smart speakers 1402, 1404, and 1506, the audio source 1410, the data collector 1412, the central data processor 1414, the connections 1416, the multiplexer 1418, and the power source 1420. However, in contrast to the home-run configuration of the smart speaker system 1400 of FIG. 14, the daisy chain configuration connects the first smart speaker 1402 to the multiplexer 1418, the second smart speaker 1404 to the multiplexer 1418 via the first smart speaker 1402, and a third smart speaker 1506 to the multiplexer 1418 via the first and second smart speakers 1402 and 1404. The connections 1416 may alternatively be implemented using, for example, a bus 1522 to which the smart speakers 1402, 1404, 1506 are connected.

The audio signals generated by the audio source 1410 are sent to the smart speakers 1402, 1404, 1506, each of which may then output substantially the same audio signal. The smart speakers 1402, 1404, 1506 collect data, process the data, and transmit the data to the data collector 1412 via the connections 1416 or bus 1522, and the multiplexer 1418. The data collector 1412 collects and/or processes the data from the smart speakers 1402, 1404, 1506 to determine statistical trends, and forwards data to the central data processor 1414.

Figure 16:
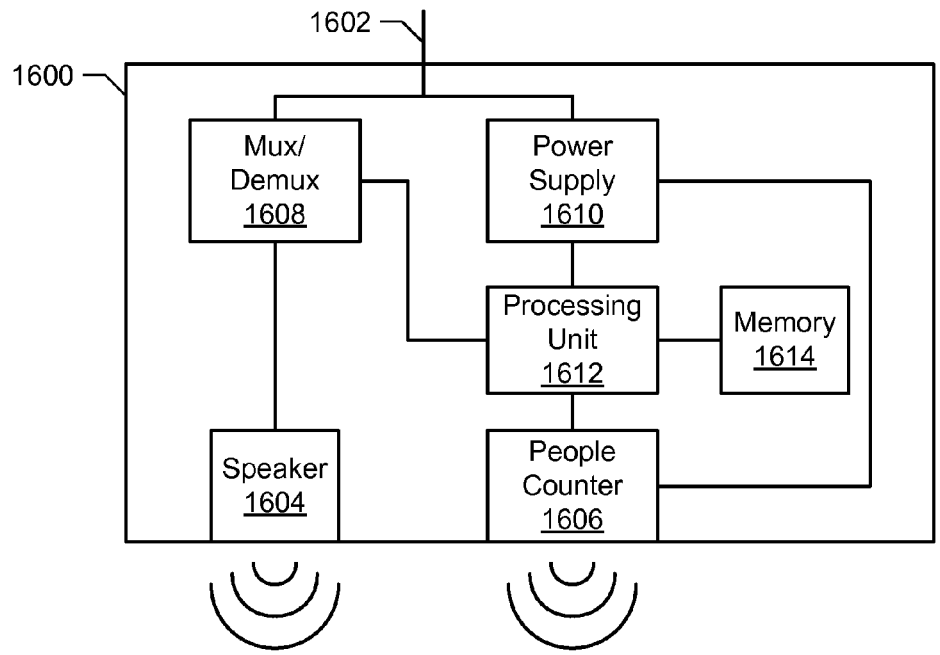
FIG. 16 is a block diagram of an example smart speaker that may be used to implement the example smart speakers of FIGS. 14 and 15.

FIG. 16 is a block diagram of an example smart speaker 1600 that may be used to implement the example smart speakers 1402, 1404, 1506 of FIG. 14 and/or FIG. 15.

A connection 1602 connects the smart speaker 1600 to the smart speaker system (e.g., the smart speaker system of FIG. 14 or FIG. 15). The connection 1602 conveys power and signals to the smart speaker 1600. The connection 1602 may be connected to the smart speaker system in a home-run or daisy-chain configuration as illustrated above. The example connection 1602 may be implemented using twisted pair speaker wire, coaxial cable, a wireless connection, and/or another type of data connection.

The smart speaker 1600 includes a speaker 1604, a people counter 1606, a multiplexer/demultiplexer (mux/demux) 1608, a power supply 1610, a processing unit 1612, and a memory 1614. The connection 1602 is coupled to the mux/demux 1608 and the power supply 1610. The power supply 1610 receives power from an external power supply (e.g., the example power supplies of FIG. 14 or FIG. 15) and may convert the power to one or more voltage(s) used by the smart speaker 1600. For example, the power supply may receive 12 volts of direct current (VDC), and generate 5VDC, 3.3VDC, 1.8VDC, or any other voltage(s) usable by the people counter 1606, the mux/demux 1608, and/or the processing unit 1612. In some examples, the connection 1602 is implemented using a wireless connection. In some implementations (e.g., a wireless connection implementation), power may be provided to the power supply 1610 via another source (e.g., not the connection 1602), such as a wall wart.

In addition to providing power, the connection 1602 conveys audio signals to the smart speaker 1600, and conveys data signals to and/or from the smart speaker 1600. The connection 1602 may also carry control signals to, for example, configure the smart speaker 1600. The audio signals (e.g., music), control signals, and/or data signals are multiplexed onto the connection 1602 by an external multiplexer (e.g., the example multiplexers 1418 of FIG. 14 or FIG. 15), and the mux/demux 1608 demultiplexes the audio signals from the data and/or control signals. The demultiplexed audio signals are sent to the speaker 1604, which converts the audio signals into sound (e.g., music, announcements, etc.) within the commercial space. Demultiplexed data and/control signals are sent to the processing unit 1612, which receives and processes the data and/or control signals to configure the example smart speaker 1600. The processing unit 1612 is provided with a memory 1614 to store data and/or instructions for use by the processing unit 1612.

In addition to demultiplexing incoming audio, control, and/or data signals, the mux/demux 1608 of the illustrated example multiplexes data signals generated by the processing unit 1612 onto the connection 1602 for transmission to the external data collector 1412. The mux/demux 1608 may multiplex the signals using time division multiplexing and/or frequency division multiplexing.

The people counter 1606 may be implemented using any desired people-counting technolog(ies). In some examples, the people counter 1606 includes two or more imaging devices that monitor the same or substantially the same field of view (e.g., one of the fields of view 1307*a-c*). In such examples, the people counter 1606 generates simultaneous images using the imaging devices and transmits the images to the processing unit 1612. If desired, the images may be of sufficiently low resolution to make human recognition of particular individuals difficult, but should have sufficiently high resolution for the processing unit 1612 to be capable of distinguish persons within the field of view. Alternatively, high resolution imaging devices may be employed. In such instances, the imaging device may supplement or supplant a camera-based security system. Using multiple imaging devices in the people counter 1606 permits the processing device 1612 to determine some characteristics of the persons within the field of view, such as, for example, the height(s) of person(s) or the location(s) of person(s) within the commercial space.

Employing successive images from the two or more imaging devices, the processing device 1612 may determine the travel velocity(ies) of person(s) and/or direction(s) of travel of person(s). Of course, additional or alternative information may be determined using the imaging devices. Using imaging devices with sufficiently high resolutions may enable the data processor 1612 to determine, for example, what items in a retail store are of interest to a customer. However, any one or more of privacy issues, equipment costs, high data rates, and/or processing constraints may discourage the use of very high-resolution cameras.

In some other examples, the people counter 1606 may be implemented using any one or more of an optical imaging device, ultrasonic detection, infrared detection, and/or any other people-counting technology. Some examples employ a single imaging device in each smart speaker 1600.

In some other examples employing multiple imaging devices, the processing device 1612 receives image data from the people counter 1606, determines the number of persons, the height(s) of the person(s), and the location(s) of the person(s) within the commercial space based on the images. The processing device 1612 may further assign an identifier to each person for use by the external data collector 1412. The identifier is useful to determine where each individual person travels during his or her time in the commercial space. The processing device 1612 transmits the collected and/or processed data to the external processing device via the mux/demux 1608 or stores the collected and/or processed data in the memory 1614 for later transmission to the external data collector.

Figure 17:
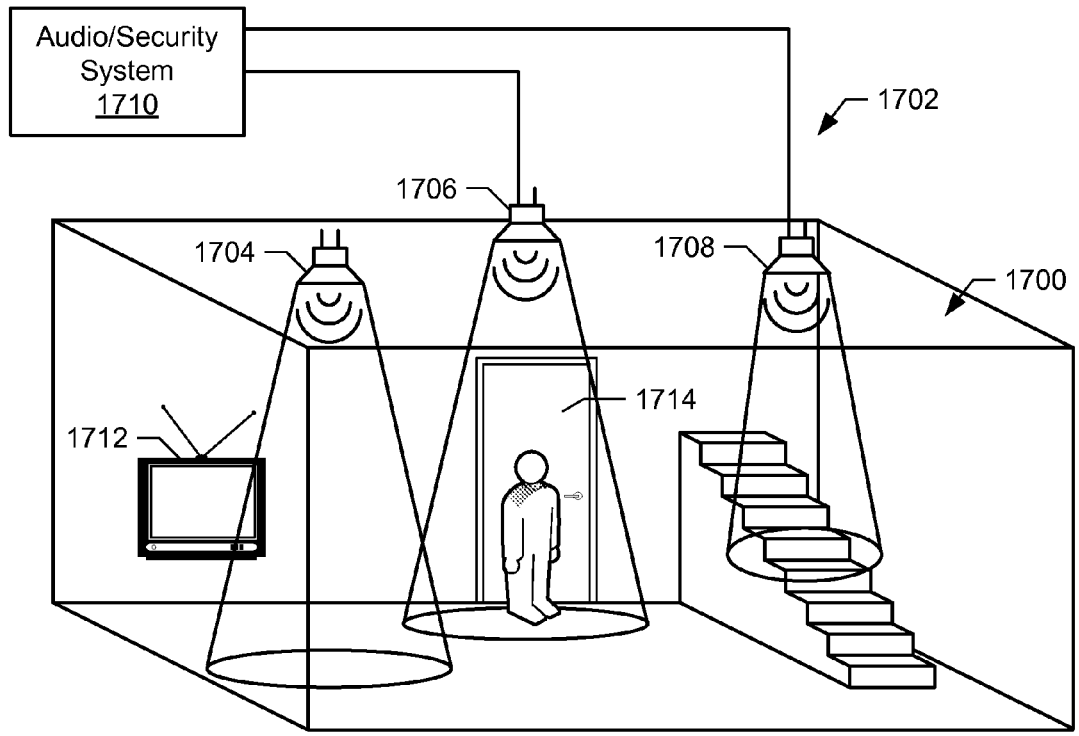
FIG. 17 is a block diagram of an example household space implementing the example smart speaker system described herein.

FIG. 17 is a block diagram of an example implementation of a smart speaker system 1702 in a household environment 1700. Many households have overhead speaker systems installed to provide, for example, ambient music or surround sound for entertainment. Additionally, many households have security systems installed, both to deter intruders and to alert household members or authorities when intruders have entered. In a similar manner to that described above with regard to a commercial space, a household environment may be provided with a smart speaker system 1702 to provide audio and people-tracking information (e.g., for security, market studies, product usage research, and/or audience measurement research) in a cost-efficient system.

The example smart speaker system 1702 of FIG. 17 includes several smart speakers 1704, 1706, and 1708, and an audio and/or security system 1710. The smart speaker 1704 may provide audio (e.g., music or television 1712 audio) to a room in which a television is located. For example, the smart speaker 1704 may be part of an entertainment or surround sound system for a home theater system that includes the television 1712. In addition to providing audio, the example smart speaker 1704 may be used to count persons in the home theater room to determine a number of persons exposed to media content in the room.

Another example smart speaker 1706 is located near a front door 1714 of the household environment 1700. Of course, the smart speakers 1704-1708 could be located near any other doors and/or windows within the household environment 1700. The smart speaker 1706 broadcasts audio and also monitors person(s) entering and exiting through the front door 1714. For example, parents may wish to monitor when their children are entering and exiting the household 1700 at any time, or during certain times (e.g., midnight to 6 A.M.). As another example, an audience measurement company may want to know how many people are in a room (e.g., a media viewing area) at a given time and/or how many people are in a home (e.g., potential audience) at the same or a different time. The smart speaker 1706 may monitor directional traffic through the front door 1714 and provide such information to persons that monitor the audio and/or security system 1710 (e.g., parents, a research entity, etc.).

A third example smart speaker 1708 may be located above a staircase leading to, for example, the sleeping areas of the household 1700. In addition to broadcasting audio, the smart speaker 1708 may detect conditions that would signify an intruder and provide an alert. For example, if the smart speaker 1708 detects that a person-sized object is ascending the stairs, and no one has descended the stairs during a preceding time frame, the smart speaker 1708 may provide data to the audio and/or security system 1710, which then alerts those in the sleeping areas who may be in danger and/or alerts the authorities to the situation.

The smart speaker system 1702 may be implemented discreetly, making the system difficult to defeat for those who do not know the smart speaker system 1702 is in place.

Figure 18:
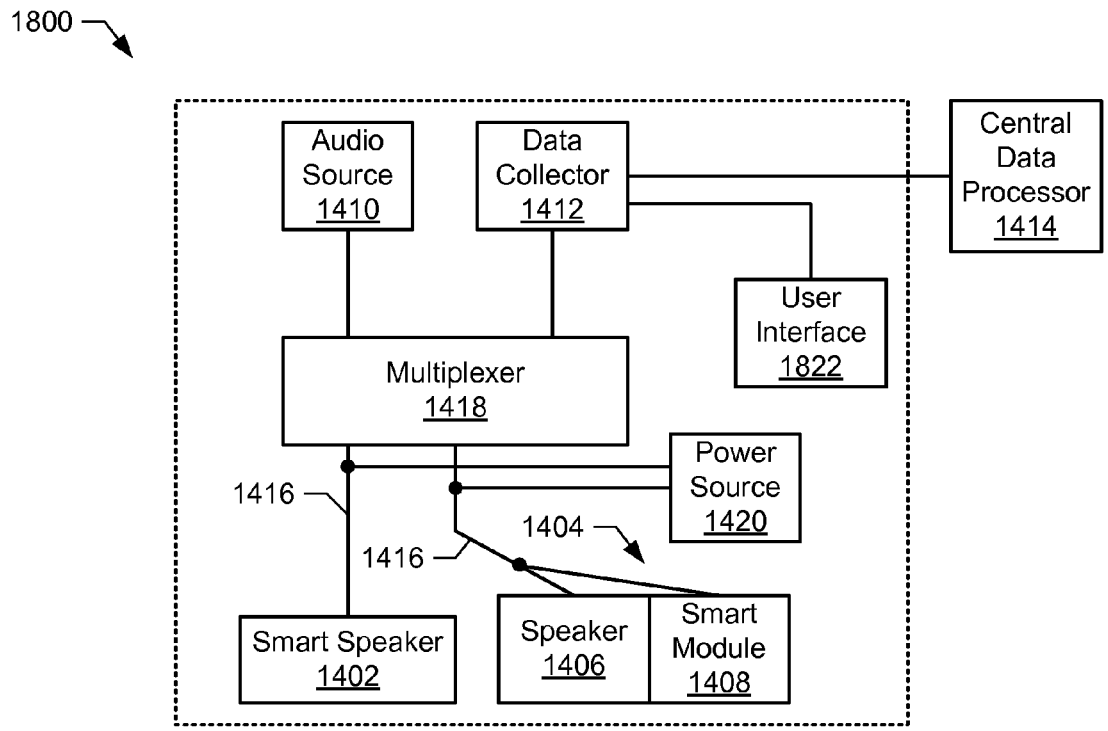
FIG. 18 is a block diagram of an example smart speaker system that may be used to implement the smart speaker system of FIG. 17.

FIG. 18 is a block diagram of an example smart speaker system 1800 that may be used to implement the smart speaker system 1702 of FIG. 17. The example smart speaker system 1800 includes many similar components to those of the smart speaker system 1400 illustrated in FIG. 14, such as the smart speakers 1402 and 1404, the speaker 1406, the smart module 1408, the audio source 1410, the data collector 1412, the central data processor 1414, the connections 1416 configured in a "home-run" configuration, the multiplexer 1418, and the power source 1420. As described above, the example smart speakers 1402 and 1404 may be installed during a new household speaker system installation, or a smart module 1408 may be installed on an existing speaker 1406 in a household speaker system.

The example audio source 1410 provides audio signals to the smart speakers 1402 and 1404. In some examples, the audio source 1410 is implemented by a home theater sound system, to which the data collector 1412 is multiplexed. The data collector 1412 of the example smart speaker system 1800 is multiplexed to the audio source 1410 using a multiplexer 1418. As described above, the multiplexer 1418 multiplexes and demultiplexes data, control, and/or audio signals to and/or from the smart speakers 1402 and 1404.

The smart speakers 1402 and 1404 collect data, process the data, and/or transmit the collected and/or processed data to the data collector 1412 in a manner similar to that described above in FIGS. 14 and 15. The data collector 1412 receives data from the smart speakers 1402 and 1404 and processes the data to determine whether any security and/or person monitoring conditions are present. The example data collector 1412 implements one or more data processing functions based on the configurations of the smart speakers. For example, if one or more smart speakers 1402 and 1404 are configured to monitor media exposure in one or more rooms, the data collector 1412 may receive such media exposure data and forward the data to the central data processor 1414. Similarly, if one or more smart speakers 1402 and 1404 are configured to monitor household security, the data collector 1412 receives security data, audience measurement data, and/or product usage data from the smart speakers 1402 and 1404. In response to receiving security data, the data collector 1412 determines whether any security conditions are present or whether any security alerts are required.

The smart speakers 1402 and 1404 may also collect audience measurement data and/or product usage data and transmit collected data to the data collector 1412. The data collector 1412 receives and stores any audience measurement data and/or product usage data received, and transmits the data to a remote central data processor 1414. A user interface 1822 may provide alerts to household members and/or provide an interface for system configuration.

In some examples, audience measurement and/or product usage functionality are included with security functionality in the data collector 1412. Thus, an audience measurement or product research company can offer the security functionality as an incentive to a household to participate in audience measurement and/or a product usage studies. The audience measurement and/or product usage studies may also be implemented using the example apparatus 100 described above to decrease privacy concerns for those persons in the household.

While the example connections 1416 from the multiplexer 1418 to the smart speakers are shown as home-run connections, the smart speakers 1402 and 1404 may be alternatively be arranged in a daisy-chain configuration, or a combination thereof.

The smart speaker systems 1302, 1400, 1500, 1702, and 1800 of FIGS. 13, 14, 15, 17, and 18, respectively, may include ordinary speakers as well as smart speakers. The ordinary speakers may be similarly multiplexed to the audio sources and data collectors, but will generally ignore the data and control signals received via the connections.

Figure 19:
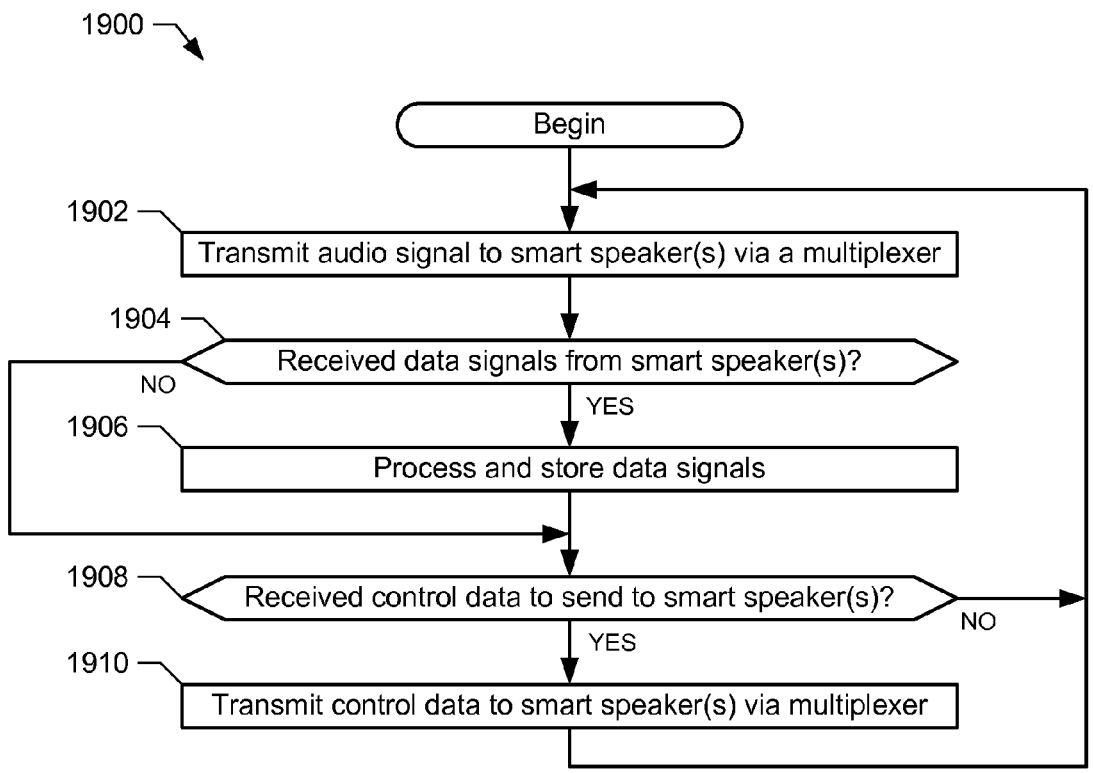
FIG. 19 is a flowchart representative of machine readable instructions which may be executed to implement the example smart speaker systems of FIGS. 14, 15, 16, 17, and/or 18.

FIG. 19 is a flowchart representative of machine readable instructions 1900 which may be executed to implement the example data collector 1412 of FIGS. 14, 15, and/or 17, or more generally the example smart speaker systems 1302, 1400, 1500, 1702, and/or 1800 of FIGS. 14, 15, 16, 17, and/or 18. The example machine readable instructions 1900 begin by transmitting audio signals (e.g., music, announcements, etc.) to one or more smart speaker(s) via a multiplexer (e.g., the multiplexer 1418 of FIG. 14) (block 1902). The example instructions then determine whether data signals (e.g., people counting data, audience measurement data, product usage data, security data) have been received from the smart speaker(s) (block 1904). If data signals have been received (block 1904), the example instructions process and store the received data signals (block 1906).

If no data signals have been received (block 1904), or after received data signals have been processed and stored (block 1906), the example instructions determine whether any control signals have been received for transmission to the smart speaker(s) (block 1908). For example, control signals may include configuration settings input by a user of the system. If control data has been received (block 1908), the example instructions transmit the control signals to the smart speaker(s) via the multiplexer (block 1910). If no control signals are received (block 1908), or after received control signals are transmitted (block 1910), control returns to block 1902 to transmit additional audio to the smart speaker(s). By implementing the example instructions 1900 of FIG. 19, a smart speaker system can monitor for people counting data while broadcasting audio.

While an example manner of implementing the example data collector 1412 of FIGS. 14, 15, and/or 17, or more generally the example smart speaker systems 1302, 1400, 1500, 1702, and/or 1800 of FIGS. 14, 15, 16, 17, and/or 18 is illustrated in FIG. 19, one or more of the elements, processes and/or devices illustrated in FIG. 19 may be combined, divided, re-arranged, omitted, eliminated and/or implemented in any other way. Further, the data collector 1412 of FIGS. 14, 15, and/or 17, or more generally the smart speaker systems 1302, 1400, 1500, 1702, and/or 1800 of FIGS. 14, 15, 16, 17, and/or 18 may be implemented by hardware, software, firmware and/or any combination of hardware, software and/or firmware. Thus, for example, any of the example data collector 1412, or more generally the example smart speaker systems 1302, 1400, 1500, 1702, and/or 1800 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example data collector 1412, or more generally the example smart speaker systems 1302, 1400, 1500, 1702, and/or 1800 are hereby expressly defined to include a tangible medium such as a memory, DVD, CD, etc. storing the software and/or firmware. Further still, the example data collector 1412 of FIG. 14 may include one or more elements, processes and/or devices in addition to, or instead of, those illustrated in FIG. 19, and/or may include more than one of any or all of the illustrated elements, processes and devices.

Figure 20:
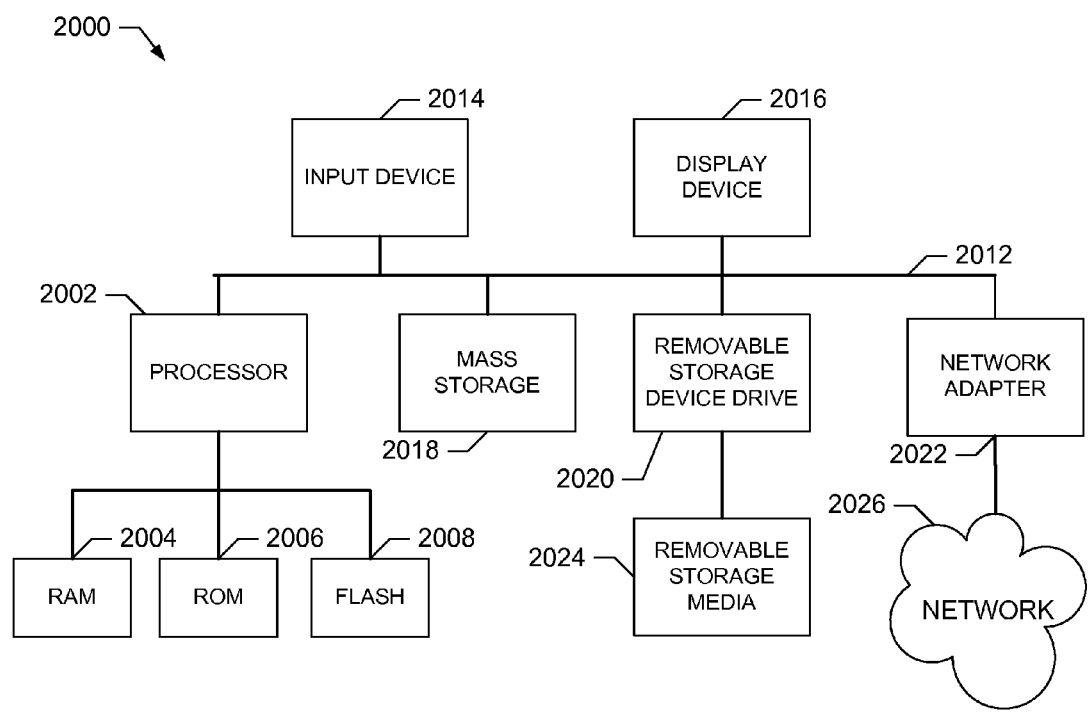
FIG. 20 is a block diagram of an example processor platform that may be used to execute the machine readable instructions of FIGS. 2, 4, 5, and/or 19 to implement the apparatus of FIGS. 1, 3, 14, 15, 16, and/or 18.

FIG. 20 is a diagram of an example processor system 2000 that may be used to execute some or all of the example machine readable instructions 200, 400, 500 and/or 1900 described in FIGS. 2, 4, 5, and 19, to implement the example apparatus 100, the example counter 114, the example data collector 1412, and/or the example central data processor 1414. The example processor system 2000 includes a processor 2002 having associated memories, such as a random access memory (RAM) 2004, a read only memory (ROM) 2006 and a flash memory 2008. The processor 2002 is coupled to an interface, such as a bus 2012 to which other components may be interfaced. In the illustrated example, the components interfaced to the bus 2012 include an input device 2014, a display device 2016, a mass storage device 2018, a removable storage device drive 2020, and a network adapter 2022. The removable storage device drive 2020 may include associated removable storage media 2024 such as magnetic or optical media. The network adapter 2022 may connect the processor system 2000 to an external network 2026.

The example processor system 2000 may be, for example, a desktop personal computer, a notebook computer, a workstation or any other computing device. The processor 2002 may be any type of processing unit, such as a microprocessor from the Intel® Pentium® family of microprocessors, the Intel® Itanium® family of microprocessors, and/or the Intel XScale® family of processors. The memories 2004, 2006 and 2008 that are coupled to the processor 2002 may be any suitable memory devices and may be sized to fit the storage demands of the system 2000. In particular, the flash memory 2008 may be a non-volatile memory that is accessed and erased on a block-by-block basis.

The input device 2014 may be implemented using a keyboard, a mouse, a touch screen, a track pad, a barcode scanner, an image scanner 102, or any other device that enables a user to provide information to the processor 2002.

The display device 2016 may be, for example, a liquid crystal display (LCD) monitor, a cathode ray tube (CRT) monitor or any other suitable device that acts as an interface between the processor 2002 and a user. The display device 2016 as pictured in FIG. 20 includes any additional hardware required to interface a display screen to the processor 2002.

The mass storage device 2018 may be, for example, a hard drive or any other magnetic, optical, or solid state media that is readable by the processor 2002.

The removable storage device drive 2020 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive and/or a solid state universal serial bus (USB) storage drive. The removable storage media 2024 is complimentary to the removable storage device drive 2020, inasmuch as the media 2024 is selected to operate with the drive 2020. For example, if the removable storage device drive 2020 is an optical drive, the removable storage media 2024 may be a CD-R disk, a CD-RW disk, a DVD disk or any other suitable optical disk. On the other hand, if the removable storage device drive 2020 is a magnetic media device, the removable storage media 2024 may be, for example, a diskette or any other suitable magnetic storage media.

The network adapter 2022 may be, for example, an Ethernet adapter, a wireless local area network (LAN) adapter, a telephony modem, or any other device that allows the processor system 2000 to communicate with other processor systems over a network. The external network 2026 may be a LAN, a wide area network (WAN), a wireless network, or any type of network capable of communicating with the processor system 2000. Example networks may include the Internet, an intranet, and/or an ad hoc network.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in any combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus to count a number of persons in a monitored environment, comprising:
   an image sensor to collect a plurality of pixels;
   a pseudorandom number generator configured to generate sets of pseudorandom coordinates;
   a reader to read first pixel data generated by first pixels of the image sensor at corresponding first times, the first pixels corresponding to respective sets of the pseudorandom coordinates;
   a comparator to compare the first pixel data with second pixel data generated by the first pixels at respective second times different from the first times to generate first change values; and
   a counter to generate a count of persons based on the first change values.

2. An apparatus as defined in claim 1, further comprising a storage device to store the change values and the sets of coordinates corresponding to the first pixels.

3. An apparatus as defined in claim 2, wherein the storage device is to store one or more counts of audience members.

4. An apparatus as defined in claim 1, wherein the counter is to map the change values to facilitate detection of motion indicative of a person.

5. An apparatus as defined in claim 4, wherein the counter comprises a map interpolator to obtain second change values based on the first change values.

6. An apparatus as defined in claim 5, wherein the map interpolator is to generate the second value values by interpolating the first change values.

7. An apparatus as defined in claim 1, wherein the counter comprises a blob discriminator to determine one or more blobs based on the first change values.

8. An apparatus as defined in claim 7, wherein the blob discriminator is to determine whether at least one of the blobs is indicative of a plurality of persons.

9. An apparatus as defined in claim 7, wherein the counter further comprises a non-human filter to determine whether the one or more blobs does not represent a person.

10. An apparatus as defined in claim 1, wherein the counter comprises a high-motion filter to determine whether the first change values are indicative of a high-motion event.

11. An apparatus as defined in claim 1, wherein the first pixel data comprises a brightness value and a color value.

12. An apparatus as defined in claim 1, further comprising a count comparator to determine whether the count of persons is equal to a previous count of persons.

13. A method to count a number of persons in a monitored environment, comprising:
   pseudorandomly selecting first pixels from a plurality of pixels in an image sensor at corresponding first times;
   collecting first information sensed by the first pixels at the first times;
   comparing the first information to second information sensed by the first pixels at corresponding second times different from the first times to generate first change values; and
   determining whether the change values are indicative of a person being present in the monitored environment.

14. A method as defined in claim 13, further comprising pseudorandomly selecting second pixels from the plurality of pixels, collecting third information sensed by the second pixels, and comparing the third information to fourth information sensed by the second pixels to generate second change values.

15. A method as defined in claim 14, wherein determining whether the first change values are indicative of the person further comprises determining whether the first and second change values in combination are indicative of the person in the monitored environment.

16. A method as defined in claim 15, further comprising determining whether the second change values are indicative of a second person in the monitored environment.

17. A method as defined in claim 13, wherein pseudorandomly selecting the first pixels comprises generating pseudorandom coordinates corresponding to respective locations of the first pixels within the plurality of pixels.

18. A method as defined in claim 13, further comprising placing the first change values in a map.

19. A method as defined in claim 13, further comprising determining whether the first change values are indicative of a high-motion event.

20. A tangible storage medium comprising instructions, which, upon execution, cause a machine to at least:
pseudorandomly select first pixels from a plurality of pixels in an image sensor at corresponding first times;
collect first information sensed by the first pixels at the first times;
compare the first information to second information sensed by the first pixels at corresponding second times different from the first times to generate first change values; and
determine whether the change values are indicative of a person being present in a monitored environment.

21. A storage medium as defined in claim 20, wherein the instructions further cause the machine to pseudorandomly select second pixels from the plurality of pixels, collect third information sensed by the second pixels, and compare the third information to fourth information sensed by the second pixels to generate second change values.

22. A storage medium as defined in claim 21, wherein the instructions are to cause the machine to determine whether the first change values are indicative of the person by determining whether the first and second change values in combination are indicative of the person in the monitored environment.

23. A storage medium as defined in claim 20, wherein the instructions are to cause the machine to pseudorandomly select the first pixel by generating one or more pseudorandom coordinates corresponding to respective locations of the first pixels within the plurality of pixels.

24. A storage medium as defined in claim 20, wherein the instructions are further to cause the machine to place the first change values in a map.

25. A storage medium as defined in claim 24, wherein the instructions are further to cause the machine to process the map to determine a count of persons present in the map.

* * * * *

UNITED STATES PATENT AND TRADEMARK OFFICE
CERTIFICATE OF CORRECTION

PATENT NO. : 8,411,963 B2
APPLICATION NO. : 12/537955
DATED : April 2, 2013
INVENTOR(S) : Robert A. Luff Page 1 of 1

It is certified that error appears in the above-identified patent and that said Letters Patent is hereby corrected as shown below:

In the Claims

Column 24, line 29 (claim 6): remove "value"

Signed and Sealed this
Twenty-fifth Day of June, 2013

Teresa Stanek Rea
*Acting Director of the United States Patent and Trademark Office*